United States Patent
Lambert et al.

(10) Patent No.: US 11,798,416 B2
(45) Date of Patent: Oct. 24, 2023

(54) SYSTEMS AND METHODS FOR PERFORMING PARKING POLICY ENFORCEMENT USING A MOBILE DEVICE

(71) Applicant: GENETEC INC., St-Laurent (CA)

(72) Inventors: Jean Lambert, Sainte-Catherine (CA); Yannick Aublet, Montréal (CA); Maxime Bousquet, Montréal (CA)

(*) Notice: Subject to any disclaimer, the term of this patent is extended or adjusted under 35 U.S.C. 154(b) by 92 days.

(21) Appl. No.: 17/080,637

(22) Filed: Oct. 26, 2020

(65) Prior Publication Data

US 2022/0130252 A1 Apr. 28, 2022

(51) Int. Cl.
| | |
|---|---|
| G06V 20/13 | (2022.01) |
| G06V 20/62 | (2022.01) |
| G07B 15/02 | (2011.01) |
| G08G 1/14 | (2006.01) |
| G08G 1/017 | (2006.01) |

(52) U.S. Cl.
CPC ............ G08G 1/148 (2013.01); G06V 20/13 (2022.01); G06V 20/62 (2022.01); G08G 1/0175 (2013.01)

(58) Field of Classification Search
CPC .................................................. G08G 1/148
See application file for complete search history.

(56) References Cited

U.S. PATENT DOCUMENTS

| | | | |
|---|---|---|---|
| 2010/0191584 A1 | 7/2010 | Fraser et al. | |
| 2015/0102946 A1* | 4/2015 | Kareev | G08G 1/0175 340/932.2 |
| 2015/0213716 A1* | 7/2015 | Aggarwal | G08G 1/146 340/932.2 |
| 2015/0317840 A1* | 11/2015 | Dutta | G06Q 20/322 705/13 |
| 2016/0155332 A1* | 6/2016 | Wang | G08G 1/096716 340/932.2 |
| 2018/0232958 A1* | 8/2018 | Wang | G06Q 20/42 |
| 2018/0350229 A1 | 12/2018 | Yigit et al. | |

OTHER PUBLICATIONS

Corresponding European application No. 21201878.2 extended European search report dated Apr. 4, 2022.

* cited by examiner

*Primary Examiner* — Joseph H Feild
*Assistant Examiner* — Pameshanand Mahase

(57) ABSTRACT

Performing parking policy enforcement using a mobile device includes presenting a set of street-and-zone pairs, each street-and-zone pair identifying a street and a zone within which at least a portion of the street is located, the street and the zone, in combination, being associated with one or more parking rules. A street-and-zone pair is selected corresponding to a location of a subject vehicle. The license plate number is transmitted to a remote parking enforcement system. Parking rights of the subject vehicle are determined based on the license plate number. It is determined whether the subject vehicle is in violation of parking rules associated with the street and the zone, in combination, of the selected street-and-zone pair based on the parking rights of the subject vehicle. A violation indication is presented indicating whether the subject vehicle is in violation of the parking rules associated with the selected street-and-zone pair.

25 Claims, 14 Drawing Sheets

SYSTEMS AND METHODS FOR PERFORMING PARKING POLICY ENFORCEMENT USING A MOBILE DEVICE

BACKGROUND

Technical Field

The present disclosure generally relates to performing parking policy enforcement using a mobile device.

Description of the Related Art

Curbsides in municipalities are a public space which are systematically managed to ensure efficient use of this limited space, while allowing for sufficient mobility of vehicle traffic to support commercial, cultural, and other forms of civic activity. The term "curbside management" refers to ways to inventory, optimize, allocate, and manage curb spaces to maximize mobility and access for the wide variety of curb demands. It encompasses the operating concepts, techniques, and practices that enable entities, such as municipalities and universities, to effectively allocate the use of their curb and other high demand areas, such as drop and load zones, ride-sharing pickup and drop off zones, and disabled person parking, i.e., handicap parking. Some cities, especially smaller cities, may run their own curbside management infrastructure, whereas larger cities may use private operators to run parts (e.g., parking meters and associated collections), or the entirety, of their curbside management infrastructure.

In some conventional curbside management systems, officers obtain and process the license plate number of each and every vehicle parked in an area being patrolled (i.e., the officer performs a "plate check" for each vehicle) to determine whether there is a violation based on specific parking rules. However, parking zones are typically composed of many streets and many rules. Each rule may apply to all streets or to a sub-set of streets and may vary according to street number along a given street.

Consequently, the parking rules applicable to vehicles being checked in a series of plate checks performed by an officer can vary greatly based on the following factors: the current parking zone, the current street, the current street number (i.e., an address location at which the plate check is performed), and the current side of street. Capturing this information can be repetitive and can make an officer inefficient and prone to making mistakes.

Conventional curbside management infrastructure may include the use of mobile devices which are carried by parking enforcement officers. Such devices may run apps for performing license plate or parking space checks which may require the parking enforcement officer to separately enter—by typing alphanumeric input on a touchscreen of the mobile device—a street name, a street number and a parking zone identifier or name, among other things. Entry of information in this manner can be cumbersome, time consuming and inefficient, to say the least. For example, this is especially burdensome when a parking policy defines rules to be applied to vehicles located between specific street numbers, because the officer must enter the street number at every plate check operation. In such a case, an officer may fail to enter the correct street number or may choose not to update the street number based on an erroneous understanding that the parking rules are the same as a previously entered street number. This can lead to parking violations not being detected and/or citations being issued improperly because the wrong set of rules has been applied to the corresponding plate check. As such, there is room for improvement.

BRIEF SUMMARY

In disclosed embodiments, an application running on a mobile device is used to perform parking enforcement. The application simplifies the workflow of a parking enforcement officer by reducing the number of required choices—and the number of actions required to make these choices. The application presents street, parking zone, and street number choices combined in a single list (i.e., a list of "street segments"). The generation of the list is a component of a solution that is facilitated by a parking policy data model design and algorithms described herein. The list of choices is generated from the configured parking policy and ensures that only unique choices are presented to the officer. A search bar is provided to allow the officer to search streets by name and will also reduce the list to any matching element, e.g., zone name, street number, and street side. A zone color may be used to quickly and easily differentiate the zones in which the officer is working, as it is common for parking zones, especially in Europe, to be designated with a color name, e.g., "red zone," "green zone," etc. In practice, a single street may run through a number of parking zones. The zone color may match with the colors defined in parking maps that a municipality provides to the public and acts as a visual indicator to ensure the zone selection by the officer is correct.

In disclosed embodiments, a geolocation function, such as a Global Positioning System (GPS) function, of the mobile device is used to reduce the list of street segments to a smaller subset. The current position of the mobile device is obtained, and a reverse geocoding operation is executed to obtain the current street name, which is used to filter the street segment list. In some implementations, a GPS location alone could be used by the system to automatically select the correct street segment and, hence, the correct parking rule set.

In disclosed embodiments, the system may use a geographic information system (GIS) with a set of defined as polygons that delimit elements such as parking enforcement zones, parking spots, or other areas having specific parking rules. Each polygon is encoded with specific information relating to parking zone, street, and street number (or street number range). The current position of the mobile device at the time of a license plate check is used by the system to resolve the corresponding street segment and the parking rules associated with that street segment. This approach does not require the officer to select a street segment before performing a license plate check. In embodiments, the system may perform, at a server, a parking zone, street, and street number resolution based on the obtained current GPS position at the time of a license plate check to resolve the location of the officer (and hence, the subject vehicle) and thereby determine which parking rules to apply. Such a configuration would be suitable where the plate check process does not require an officer to conduct it, such as when the process is done by a license plate reading sensor on a patrol vehicle.

A method of performing parking policy enforcement, using a mobile device having one or more processors, memory, and a network interface, may be summarized as including: presenting a set of street-and-zone pairs via a user interface displayed on a display of the mobile device, each street-and-zone pair identifying a street and a zone within which at least a portion of the street is located, the street and the zone, in combination, being associated with one or more parking rules; receiving, via the user interface, a selection of a street-and-zone pair of the set of street-and-zone pairs, the selected street-and-zone pair corresponding to a location of a subject vehicle; obtaining a license plate number of the subject vehicle; transmitting, via the network interface, the license plate number to a remote parking enforcement system; determining parking rights of the subject vehicle based at least in part on the license plate number; determining whether the subject vehicle is in violation of one or more parking rules associated with the street and the zone, in combination, of the selected street-and-zone pair based at least in part on the parking rights of the subject vehicle; and presenting a violation indication via the user interface, the violation indication indicating whether the subject vehicle is in violation of the one or more parking rules associated with the street and the zone, in combination, of the selected street-and-zone pair.

Embodiments may include one or more of the following features. The determining parking rights of the subject vehicle based at least in part on the license plate number may include receiving, via the network interface, parking rights information for the subject vehicle from the remote parking enforcement system. The method may further include transmitting, via the network interface, the selected street-and-zone pair to the remote parking enforcement system, wherein said determining whether the subject vehicle is in violation of one or more parking rules associated with the street and the zone, in combination, of the selected street-and-zone pair comprises receiving, via the network interface, the violation indication.

Each street-and-zone pair may identify a segment of the street corresponding to said at least a portion of the street located within the zone, and the segment of the street and the zone, in combination, may be associated with the one or more parking rules. The segment of the street corresponding to said at least a portion of the street located within the zone may correspond to a street number or number range of the street. The segment of the street corresponding to said at least a portion of the street located within the zone may correspond to a side of the street. In said presenting the set of street-and-zone pairs via the user interface displayed on the display of the mobile device, the zone of each street-and-zone pair may be identified in conjunction with an indication of at least one of: the street number or number range corresponding to the segment of the street; and the side of the street corresponding to the segment of the street. In said presenting a set of street-and-zone pairs via a user interface displayed on a display of the mobile device, the zone of each street-and-zone pair may be identified using a color code.

The method may further include determining a location of the mobile device; and filtering a plurality of street-and-zone pairs based at least in part on proximity to the determined location of the mobile device to obtain the set of street-and-zone pairs. In some embodiments, the location of the mobile device is determined by geolocation. In some embodiments, the location of the mobile device is a GPS location of the mobile device. In some embodiments, filtering the plurality of street-and-zone pairs comprises identifying one or more street-and-zone pairs in the plurality of street-and-zone pairs that are within a distance of the determined location of the mobile device and including the identified one or more street-and-zone pairs in the set of street-and-zone pairs, where the set of street-and-zone pairs excludes the street-and-zone pairs of the plurality of street-and-zone pairs that are beyond the distance. In some embodiments, filtering the plurality of street-and-zone pairs comprises sorting the plurality of street-and-zone pairs according to street-and-zone pairs nearest to the determined location of the mobile device to obtain the set of street-and-zone pairs. The method may further include receiving, via the network interface, the plurality of street-and-zone pairs from the remote parking enforcement system and storing the plurality of street-and-zone pairs in a database of the mobile device. The method may further include receiving, via the user interface, a user input; and filtering the set of street-and-zone pairs based at least in part on the user input. The obtaining the license plate number may include receiving, via the user interface, a user input. The obtaining the license plate number may include capturing, by the mobile device, an image of the license plate; and determining the license plate number from the image. The obtaining the license plate number may include capturing, by the mobile device, an image of the license plate; transmitting the image of the license plate, via the network interface, to the remote parking enforcement system; and receiving, via the network interface, the license plate number from the remote parking enforcement system.

The method may further include receiving evidentiary information relating to the subject vehicle; and transmitting, via the network interface, to the remote parking enforcement system the evidentiary information. The evidentiary information may include user-input information identifying one or more characteristics of the subject vehicle. The evidentiary information may include photos taken using a camera of the mobile device. The method may further include receiving, via the network interface, from the remote parking enforcement system status information relating to the subject vehicle, the status information including at least one of: expired parking ticket information, currently active citations, and expired citations; and presenting said status information relating to the subject vehicle via a user interface displayed on the display of the mobile device. Each zone may have an associated schedule defining a time window within which parking rules associated with said zone are in force, and the method may further include providing an indication to the user via the user interface of the mobile device if a current time is outside the time window.

A mobile device to perform parking policy enforcement may be summarized as including one or more processors, a display, memory, and a network interface, the memory of the mobile device storing a set of instructions that, as a result of execution by the one or more processors, cause the one or more processors to perform the methods summarized above. A non-transitory computer-readable storage medium may be summarized as having computer-executable instructions stored thereon that, when executed, cause at least one computer processor to perform the methods summarized above.

A method of performing parking policy enforcement, using a system having one or more processors, memory, and a network interface, may be summarized as including: receiving, via the network interface, a license plate number of a subject vehicle and a selected street-and-zone pair of a set of street-and-zone pairs, each street-and-zone pair identifying a street and a zone within which at least a portion of the street is located, the street and the zone, in combination, being associated with one or more parking rules, the selected street-and-zone pair corresponding to a location of the subject vehicle; determining parking rights of the subject vehicle based at least in part on the license plate number; determining whether the subject vehicle is in violation of one or more parking rules associated with the street and the zone, in combination, of the selected street-and-zone pair based at least in part on the parking rights of the subject vehicle; and transmitting a violation indication, via the network interface, the violation indication indicating whether the subject vehicle is in violation of the one or more parking rules associated with the street and the zone, in combination, of the selected street-and-zone pair.

A system to perform parking policy enforcement may be summarized as including one or more processors, memory, and a network interface, the memory storing a set of instructions that, as a result of execution by the one or more processors, cause the one or more processors to perform the methods summarized above. A non-transitory computer-readable storage medium may be summarized as having computer-executable instructions stored thereon that, when executed, cause at least one computer processor to perform the methods summarized above.

DETAILED DESCRIPTION

In the following description, certain specific details are set forth to provide a thorough understanding of various disclosed implementations. However, one skilled in the relevant art will recognize that implementations may be practiced without one or more of these specific details, or with other methods, components, materials, etc. In other instances, well-known structures associated with computer systems, server computers, and/or communications networks have not been shown or described in detail to avoid unnecessarily obscuring descriptions of the implementations.

Reference throughout this specification to "one implementation," "an implementation," or "implementations" means that a particular feature, structure or characteristic described in connection with the implementation(s) is included in at least one implementation. Thus, appearances of the phrases "in one implementation," "in an implementation," or "in implementations" in the specification are not necessarily all referring to the same implementation(s). Furthermore, the particular features, structures, or characteristics may be combined in any suitable manner in one or more implementations. As used in this specification and the appended claims, the singular forms "a," "an," and "the" include plural referents unless the context clearly dictates otherwise. It should also be noted that the term "or" is generally employed in its sense including "and/or" unless the context clearly dictates otherwise.

Figure 1:
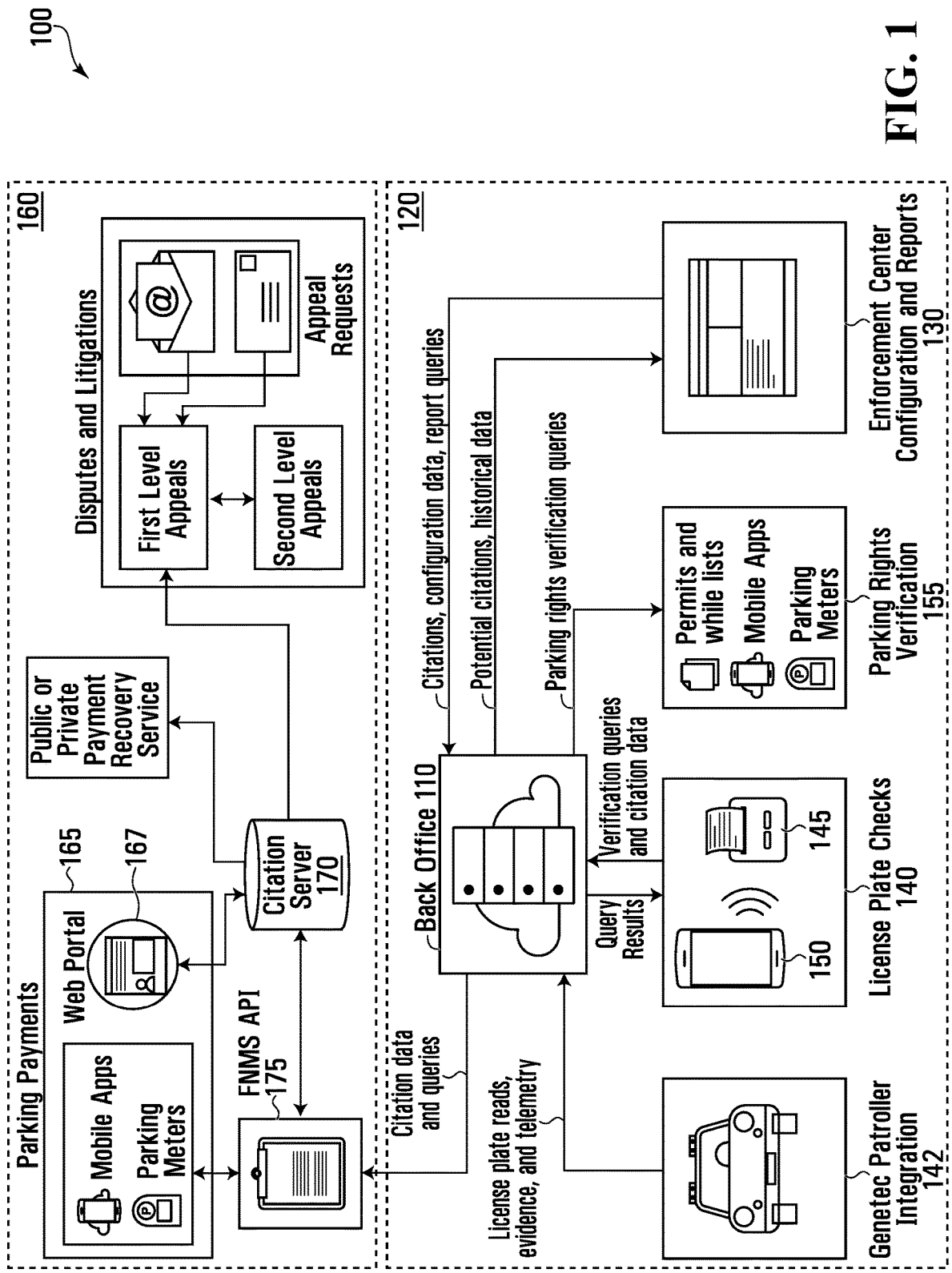
FIG. 1 is a block diagram of a system to perform parking policy enforcement using a mobile device, according to one illustrated embodiment.

FIG. 1 is a block diagram of a system 100 to perform parking policy enforcement using a mobile device. In implementations, the system 100 and its operational environment may be referred to as a parking information management system (PIMS), which may be described as comprising a parking policy enforcement system 120 and a parking citation management system 160.

The parking policy enforcement system 120 includes a network-based "hub" 110 (e.g., network-based server computer(s) and associated computing environment, one or more servers, server clusters, cloud computing systems, distributed computing systems or the like) which hosts a number of front-end, customer-facing subsystems of the parking policy enforcement system 120. The customer is an entity which is responsible for implementing curbside management, such as a municipality and/or a parking operator. Specifically, the front-end subsystems of the parking policy enforcement system 120 provide parking policy enforcement for curbside, i.e., on-street, parking. In implementations, the system 100 may be multi-tenant, in which case it may provide services to a number of different entities at the same time from a shared environment with shared data, which provides a significant cost savings compared to installing and maintaining a separate environment for each customer. In such a case, the system 100 can provide shared data (e.g., for multi-city parking operators) from a shared data pool, while maintaining segregation of data for individual customers (e.g., individual municipalities).

The front-end subsystems of the parking policy enforcement system 120, which interact with the hub 110, include a configuration and reports portal 130 for controlling configuration settings and producing reports, an enforcement subsystem 140 (of which there are typically numerous instances—one for each parking officer) used by a parking officer to perform license plate number checks of parked vehicles, a vehicle-based enforcement system 142, and a parking rights validation subsystem 155 to check for permits and white lists and to check for parking rights obtained via parking meters, mobile apps, etc.

Each instance of the enforcement subsystem 140 includes a mobile device 150, e.g., a smartphone or personal digital assistant (PDA), which communicates with the hub 110. The mobile device 150 includes one or more processors, memory (e.g., random access memory), and a display 152 (see FIG. 4). In some cases, a printer 145 may be used in conjunction with the mobile device 150 to print hardcopy citations, if this is required by the parking policy of a particular municipality. These devices are carried by a parking enforcement officer to facilitate enforcement of the parking policies of the municipality.

The mobile device 150 runs an application (referred to herein as an "app") which runs on a mobile operating system, e.g., Android. The app is cloud-based in that it is connected via one or more networks (e.g., a mobile data network, a public network, for example, such as the Internet, or a private network, for example, such as a WAN, LAN, or the like) to the hub 110 and sends validation queries and citation data to the hub 110 and receives query results from the hub. The hub 110, upon receiving a query from the mobile device 150 will, in turn, send a query or queries to other systems and/or subsystems to obtain data to send back to the mobile device 150.

The app enables the mobile device 150, operated by the parking enforcement officer, to obtain a license plate number from a vehicle proximate the parking enforcement officer and send it to the hub 110, along with other pertinent information, such as location information. The app may also include functions for logging officer work, geolocation (i.e., determining a location of the mobile device by geolocation) and tracking, and geo-tagging, to provide information on the location of officers in the field even when their patrol vehicle is not equipped with such features. The app allows for quick scanning and decoding of a license plate and quick entry of related information by the officer to increase the efficiency of the process of "running plates." The improved efficiency is especially important in cases, e.g., in Europe, where an officer typically must systematically scan streets of parked vehicles to enforce a "pay-by-plate" parking policy, because the vehicles do not display a parking ticket (i.e., permit) as in a "pay-and-display" parking policy. The license plate check process and operation of the app is discussed in further detail below.

The configuration and reports portal subsystem 130 includes a system configuration component to enter and store parking policies, e.g., in the form of parking rules, which are in force for each entity (e.g., municipality). The portal subsystem 130 further includes a settings component which sets up and stores parameters for the mobile app used to perform license plate checks, as described in further detail below. For example, the settings include parameters such as the required number of evidentiary photos for each license plate check/citation, whether citations are to be printed upon issuance, etc. The portal subsystem 130 may generate various reports relating to the issuance of citations. The portal subsystem 130 may be a web-based front-end that is accessible via a web-browser running on a computing device (e.g., a computer, a laptop, a mobile device, a tablet, a smart phone, a workstation, or the like). In some implementations, the portal subsystem 130 may be accessible by the mobile device 150.

The parking rights validation subsystem 155 is queried as part of a license plate check to determine whether there are parking rights in existence for a particular license plate number and, accordingly, whether there are parking rights for the particular vehicle (i.e., the "subject vehicle") associated with the particular license plate number. The mobile device 150 initiates the license plate check by sending a query with the license plate number of the subject vehicle, obtained using the mobile device 150, and the specific street-and-zone pair associated with the location of the subject vehicle selected by the user of the mobile device 150. In response, the hub 110 queries the parking rights validation subsystem 155 for any existing parking rights and based on that information determines whether there is a violation. In implementations, information on parking rights may be captured by the parking rights validation subsystem 155 and relayed back to the hub 110 during a license plate number check by querying the systems of various parking rights providers for a given zone to see if a specific license plate has a valid right in that zone.

In the implementation discussed above, the license plate number check algorithm is performed by the hub 110 based on the parking rights information obtained from the parking rights validation subsystem 155. In an alternative implementation, the license plate number check algorithm could be performed on the mobile device 150 acting in conjunction with the hub 110. For example, the mobile device 150 could send a license plate check request to the hub 110, which would query the parking rights validation subsystem 155 to obtain parking rights information, which would be returned to the mobile device 150 to execute the license plate check algorithm to determine whether there is a violation.

In implementations, the parking rights validation subsystem 155 includes the following services: a citation service, a parking validation service, FPS server gateway (i.e., the server gateway handling information on municipal parking tickets, called "forfait de post-stationnement" in French, issued to vehicles parked in violation of parking rules), zone manager, and digital parking rights services (DPRS). In performing a license plate number check, the app running on the mobile device 150 communicates to the citation service, which relays the call (e.g., query) to the parking validation service (PVS) of the parking rights validation subsystem 155. The PVS resolves the applicable parking zone, i.e., the parking zone in which the subject vehicle is parked, with the help of the zone manager. The PVS determines whether the zone schedule for the applicable zone is active (e.g., whether time and/or day—based zone rules are currently applicable to vehicles parked within the zone) and may also determine whether the particular license plate number is "frozen" (i.e., a license plate number which cannot be cited because, for example, it is a municipal vehicle).

Once parking rights determinations are made, the PVS determines whether there are any existing citations for the subject vehicle by accessing a citations server 170 (discussed in further detail below) via the FPS server gateway (i.e., a gateway through which the hub 110 and the citations server 170 communicate). If no active citation is found, then the PVS determines the applicable parking rule set to execute. Each parking rule may generate a call to an external parking rights provider via the DPRS, which is an interface to external services, such as parking meter services, e.g., parking apps which facilitate payment for parking spaces or zones, to determine whether the subject vehicle has a valid parking right. The parking rights and citation information is returned to the hub 110 via the citation service of the parking rights validation subsystem 155.

In the case of metered parking checks, there is a determination of whether parking rights exist for a vehicle parked in a particular parking space. Upon receiving a query, there is a retrieval of information on existing parking rights of the subject vehicle. For example, the parking rights validation subsystem 155 checks for the existence of permits, such as resident permits, and white lists, such as lists of municipal vehicles which are not subject to general parking policies. The parking rights validation subsystem 155 may also reach out to external sources of information, including third-party sources, to retrieve parking rights information. In implementations, the parking rights validation subsystem 155 checks data received from mobile apps and parking meters and payment terminals, referred to as digital payment services or parking rights services, which allow for the purchase of parking rights within a particular zone or area. For example, in some parking plans, there are common meters which are used for each block of on-street parking. In some cases, a mobile app may be used to purchase parking rights for a specific time period and/or zone.

As discussed above, the result of a parking rights query to the parking rights validation subsystem 155 is a set of one or more parking rights, if any exist, associated with the license plate number and, accordingly, the vehicle, which is the subject of the query. The results are filtered to match with the location of the vehicle which is the subject of the license plate check. Specifically, the parking rights are compared to the street and zone combination selected by the parking officer to see if there is a parking right which corresponds to the specific street and zone. For example, a particular license plate number may be associated with a daily parking ticket (i.e., parking pass or permit) and also a resident parking permit—only one of which may apply to the street and zone in which the vehicle is located at the time of the license plate check.

In an alternative implementation, the app running on the mobile device 150 may allow for enforcement to be done using parking space—based enforcement, as opposed to license plate—based enforcement. In such a case, the parking rights validation subsystem 155 is queried to determine whether there are parking rights in existence for particular curbside parking areas (e.g., curbside parking spaces), rather than for particular vehicles. For example, based on the determined location of the mobile device 150, the user may be presented with a list of proximate parking spaces, e.g., on a particular block, indicating those which are not currently in a paid status (or the status may be indicated only after selection of a particular space). This may involve retrieving, from a database of curbside parking area data, a set of curbside parking areas which are filtered from the curbside parking area data based at least in part on the determined location of the mobile device to produce a filtered set of curbside parking areas. The filtered set of curbside parking areas is presented to a user via a user interface of the mobile device 150. The user makes a selection of a curbside parking area of the filtered set of curbside parking areas, and the mobile device 150 retrieves information via a network interface, which is, e.g., a hardware and/or software-based component, such as a network interface controller or card (NIC), a local area network (LAN) adapter, or a physical network interface, etc., of the mobile device 150. The retrieved information specifies existing parking rights for the selected curbside parking area, e.g., whether the selected curbside parking area is currently in a paid status. As noted above, in implementations, the existing parking rights of proximate curbside parking areas may be retrieved prior to the selection of a specific curbside parking area so the status of each of the listed spaces can be indicated when the list is presented to the user. A determination is made as to whether a subject vehicle is parked in violation based on the existing parking rights for the selected curbside parking area. For example, the parking enforcement officer may see that a vehicle is parked in a selected curbside parking area which is not in a paid status. The mobile device 150 sends citation data via the network interface to initiate generation of a citation if it is determined that the subject vehicle is parked in violation.

The hub 110 is connected to a number of back-end subsystems forming the parking citation management system 160. These subsystems manage the lifecycle of the citations produced by the parking policy enforcement system 120, including managing citation aging, which tracks and initiates time-based events such as: citation created, violator notified, reminder sent, second reminder sent, price increased due to late payment, collections, etc. The parking citation management system 160 also provides a citizen web portal 167 to allow the public to review their citation information, evidence (e.g., evidentiary photos, etc.), and current fees due. In addition, the parking citation management system 160 handles citation payment, collections (e.g., sending the citation dossier to a bailiff), violation identification (e.g., via a national registry), dispute management (including judicial proceeding), etc.

The hub 110 is connected to a citation server 170, which may be implemented as an integral part of the system 100 along with the parking policy enforcement system 120 or run by a third party, through an application program interface (API) 175. For example, in France, the hub 110 may send citation queries to the citation server 170 via the Federation Nationale des Métiers du Stationnement (FNMS) API 175, which is a standardized interface for citation queries. In implementations, communications with the citation server 170, e.g., via the FNMS API 175, are bidirectional, e.g., the communications allow for sending a newly issued citation to the citation server 170 as well as retrieving information on existing citations and their respective statuses.

In implementations, the communications with the citation server 170 may allow for the hub 110 to look up citations, store a newly issued citation, perform a pricing calculation (e.g., pricing for the amount due plus any fines and/or late fees), and to look up specific citations by an identification number. In such a case, the citations are not stored by the hub 110. Rather, the citations are indexed by the hub 110 and filtered and full records for particular citations are retrieved as needed from the citation server 170. Such an arrangement avoids storing sensitive information in the hub 110 which may be subject to privacy regulations.

In implementations, the price of a citation issued by the mobile device 150 (i.e., the amount of a fine to be paid) may be calculated by sending request to the citations server 170 via the API 175, especially when pricing rules for the jurisdiction are complicated. For example, in France, the fine may vary depending on the time the citation was issued and the existence of parking payments in the past up to a specific time limit. In such a case, if someone paid, e.g., $3 for one hour of parking until 13:00 and the license plate check were performed at 13:15, the citation pricing rules might require that the $3 be deducted from the base fine price of, e.g., $40 to take into account the partial payment of the parking fees that was made. On the other hand, if the license plate check in this example were performed at 16:00, then the citation would carry the full fine of $40.

In implementations, there may be a retrieval, by the mobile device 150, of information on citations associated with the license plate number to determine whether there is a currently active citation. An indication of any currently active citation may be provided to the user via the user interface of the mobile device 150 to help avoid the issuance of a second citation for an ongoing violation. For example, in some jurisdictions, a first citation given for improper parking may be in effect for a specific time period, e.g., two hours, after which a further citation may be issued.

The citation server 170 stores issued citations and handles "aging" of the citations, which is a process which includes reminders sent to the subject of each citation at certain time intervals, as well as the addition of fines as the citations pass particular age thresholds. For example, in some cases, if a citation is ignored for 30 days, the citation server 170 may initiate the sending of a reminder to the subject of the citation. After another 30 days, a second reminder may be sent, along with an indication that a fine has been added because the citation is older than 60 days. Other fines and penalties may follow, including the initiation of judicial proceedings. The citation server 170 maintains a status of citations as they undergo judicial proceedings, e.g., appeal requests, first level appeals, second level appeals, etc. When a citation dossier is sent for collection, this is typically handled by an external agency and, in such a case, the citation server may keep track of the payments and overall status—without recovering any further details.

The parking payments subsystem 165 is responsible for collecting payments or payment transaction information for citations. An external payment processing system (not illustrated) may be used to collect payments and the parking payments subsystem 165 may confirm that the amounts paid to the citation server 170 in order for transactions to be written to citation files. In implementations, the hub 110 may lookup or update information on the citation server 170 via the API 175. In alternative implementations, the hub 110 may access the parking payments subsystem 165 via the same API 175 used to access the citation server 170. The collection of payments for citations and dispute initiation may be done via a website/web portal which is in communication with the citation server 170. Generally speaking, when a user receives a citation, they have a few options: pay the citation, dispute the citation, or ignore the citation. In the case of payment, users may make payments in various ways, such as going to a parking vendor, paying via a website/web portal (and/or initiating a dispute), paying using the same app from which they purchase parking right, or they may pay directly at a parking meter. In FIG. 1, mobile apps and parking meters are depicted in both the parking rights validation subsystem 155 and the parking payments subsystem 165 to illustrate their different utilization contexts, whereas, in implementations, they may be the same. In the context of parking rights validation, users of a parking system may have many ways to purchase parking rights (e.g., daily ticket or permit), such as at parking meters, using a smartphone app, or via a website. As discussed above, information on parking rights is captured, by the parking rights validation subsystem 155, and relayed back to the hub 110 during a license plate number check by querying the systems of various parking rights providers for a given zone to see if a specific license plate has a valid right in that zone.

Figure 2:
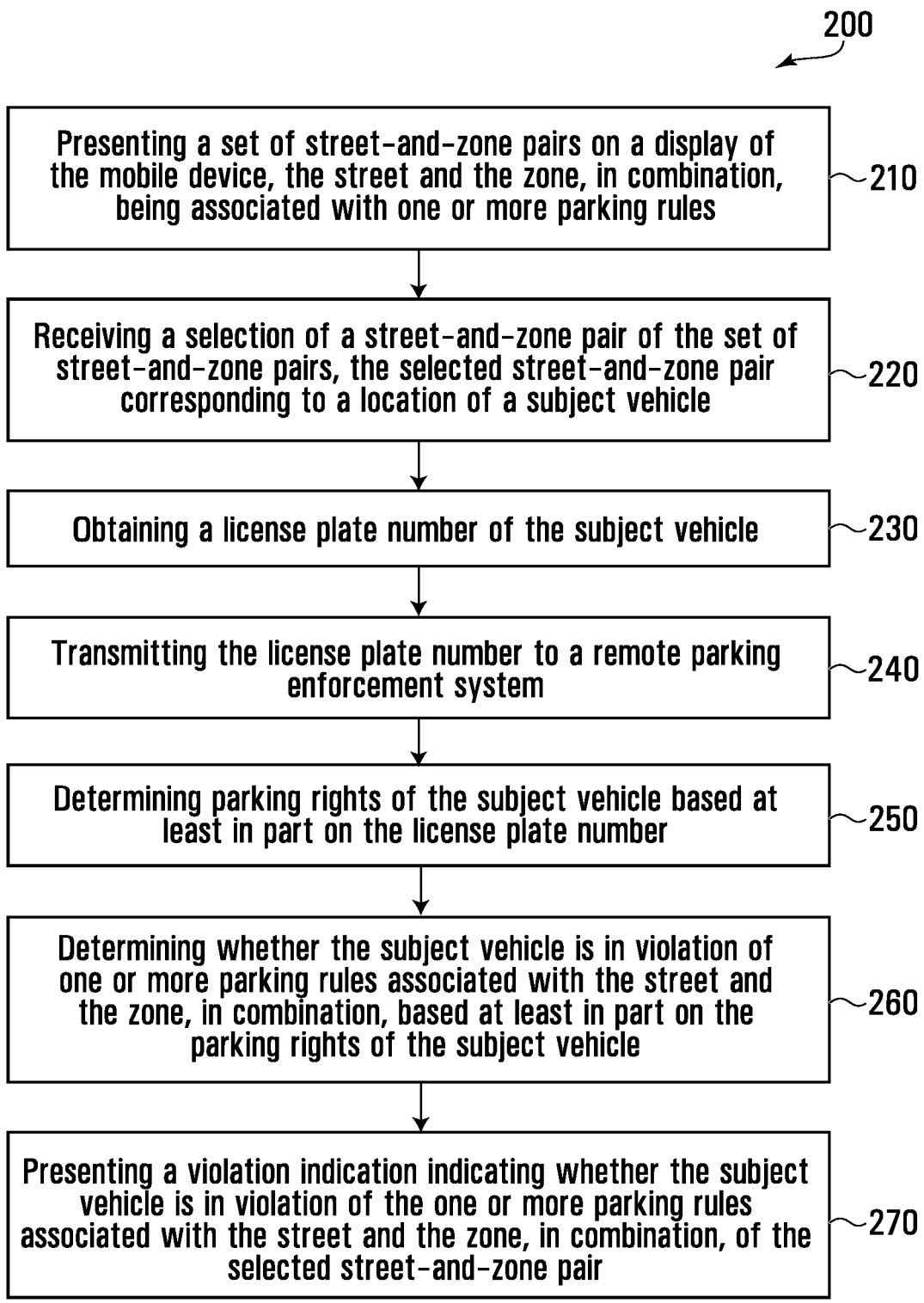
FIG. 2 is a flow chart of a method of performing parking policy enforcement using a mobile device, according to one illustrated embodiment.

FIG. 2 is a flow chart of a method 200 of performing parking policy enforcement using a mobile device 150. The method includes presenting (210) a set of street-and-zone pairs via a user interface displayed on a display 152 of the mobile device 150. Each street-and-zone pair identifies a street and a zone within which at least a portion of the street is located. The street and the zone, in combination, are associated with one or more parking rules. In implementations, a location of the mobile device 150 may be determined, e.g., using geolocation, and the displayed set of street-and-zone pairs may be a filtered set based at least in part on proximity to the determined location. The location of the mobile device 150 may be determined based on a GPS location of the mobile device 150 obtained from a GPS receiver of the mobile device 150. For example, the location of the mobile device 150 may be a GPS location of the mobile device 150. By way of another example, the location of the mobile device 150 may be a GPS location of the mobile device that is enhanced, improved or augmented, with additional information (e.g., using information for a cellular signal, dead reckoning information, etc.). The mobile device 150 may have a plurality of street-and-zone pairs, for example, stored in a database of the mobile device 150. The mobile device 150 may obtain the plurality of street-and-zone pairs from the hub 110, for example, at the beginning of a patrol, and then store the plurality of street-and-zone pairs in a database of the mobile device 150. In some embodiments, the plurality of street-and-zone pairs may be filtered to identify one or more street-and-zone pairs in the plurality that are within a distance of the determined location of the mobile device 150. The identified one or more street-and-zone pairs may then be used to generate the filtered set of street-and-zone pairs, and, in this example, the filtered set of street-and-zone pairs excludes (i.e., does not contain) the street-and-zone pairs that are beyond this distance. The distance may be a predefined distance value stored in the memory of the mobile device 150 or may be a user defined distance value (i.e., the mobile device 150 may receive user input indicating the distance value). The distance from the determined location of the mobile device 150 may be considered to correspond to a radius around the the determined location of the mobile device 150. The one or more street-and-zone pairs in the filtered set of street-and-zone pairs may be considered to correspond to the street-and-zone pair(s) of the set of street-and-zone pairs that are within the radius, and the street-and-zone pair(s) of the set of street-and-zone pairs that are outside of this radius are excluded from (i.e., not contained within) the filtered set of one or more street-and-zone pairs. Each of the street-and-zone pairs in the plurality of street-and-zone pairs may be associated with a geographical location that is associated with a given street-and-zone pair, which allows the filtering to be performed. The geographical location that is associated with a given street-and-zone pair may be a geographical location associated with the street name of the given street-and-zone pair. The geographical location that is associated with a given street-and-zone pair may be a geographical location associated with the street name and the street number or the number range of the street, of the given street-and-zone pair. The geographical location of each street-and-zone pair may be compared to the determined location of the mobile device 150 to identify the one or more street-and-zone pairs in the plurality of street-and-zone pairs that have a geographical location that is within the distance of the determined location of the mobile device, in order to generate the filtered set of street-and-zone pairs. In some embodiments, the filtering may be performed to list the the set of street-and-zone pairs in order of street-and-zone pairs nearest to the geographical location of the mobile device 150. In implementations, a location of the mobile device 150 may be determined, e.g., using geolocation, and the determined location may be used to obtain a street name for location of the mobile device 150, and the displayed set of street-and-zone pairs may be filtered (e.g., string-to-string matching) based on the street name. Alternatively, or in addition, the displayed set of street-and-zone pairs may be filtered based at least in part on a user input, e.g., partial entry of a street name. In implementations where no filtering is performed, the plurality of street-and-zone pairs may correspond to the set of street-and-zone pairs. The method further includes receiving (220), via the user interface of the mobile device 150, a selection of a street-and-zone pair of the set of street-and-zone pairs. The selected street-and-zone pair corresponds to the location of a subject vehicle.

The method further includes obtaining (230) a license plate number of the subject vehicle; and transmitting (240), via the network interface of the mobile device 150, the license plate number to the hub 110. In implementations, the obtaining of the license plate number may include capturing, e.g., by a camera of the mobile device 150, an image of the license plate and determining the license plate number from the image. In implementations, the image of the license plate may be transmitted to the hub 110 to be processed to obtain the license plate number, which is sent back to the mobile device 150. Alternatively, the license plate number may be obtained from a user input, e.g., from a user typing the license plate number on a touchscreen keyboard of the mobile device 150. In implementations, as discussed in further detail below, the method may further include receiving evidentiary information relating to the subject vehicle and transmitting such information to the hub 110. The evidentiary information may include, for example, user-input information identifying one or more characteristics of the subject vehicle and/or photos taken using a camera of the mobile device.

The method further includes determining (250) parking rights of the subject vehicle based at least in part on the license plate number. In implementations, the determining of the parking rights of the subject vehicle may involve the mobile device 150 receiving parking rights information for the subject vehicle from the hub 110, which allows for the determination of a violation (discussed below) to be done by the mobile device 150.

The method further includes determining (260) whether the subject vehicle is in violation of one or more parking rules associated with the street and the zone, in combination, of the selected street-and-zone pair based at least in part on the parking rights of the subject vehicle. In implementations, this determination may be made at the hub 120. In such a case, the method includes transmitting the selected street-and-zone pair to the hub 110 and receiving the violation indication from the hub 110. There is, in effect, a comparing, at the hub 110, of information on existing parking rights of the subject vehicle to the applicable parking rules to determine whether the subject vehicle is in violation of the parking policy. The method further includes presenting (270) a violation indication via the user interface of the mobile device 150. The violation indication indicates whether the subject vehicle is in violation of the one or more parking rules associated with the street and the zone, in combination, of the selected street-and-zone pair. If, in comparing the information on existing parking rights of the subject vehicle to the retrieved parking policy, it is determined that the subject vehicle is in violation of the parking rules, then citation data is output by the hub 110 to the citation server 170 (via the FNMS API 175) to initiate generation of a citation. Otherwise, an indication may be output to the user via the user interface of the mobile device 150 that the subject vehicle is not in violation of the parking policy.

Figure 3:
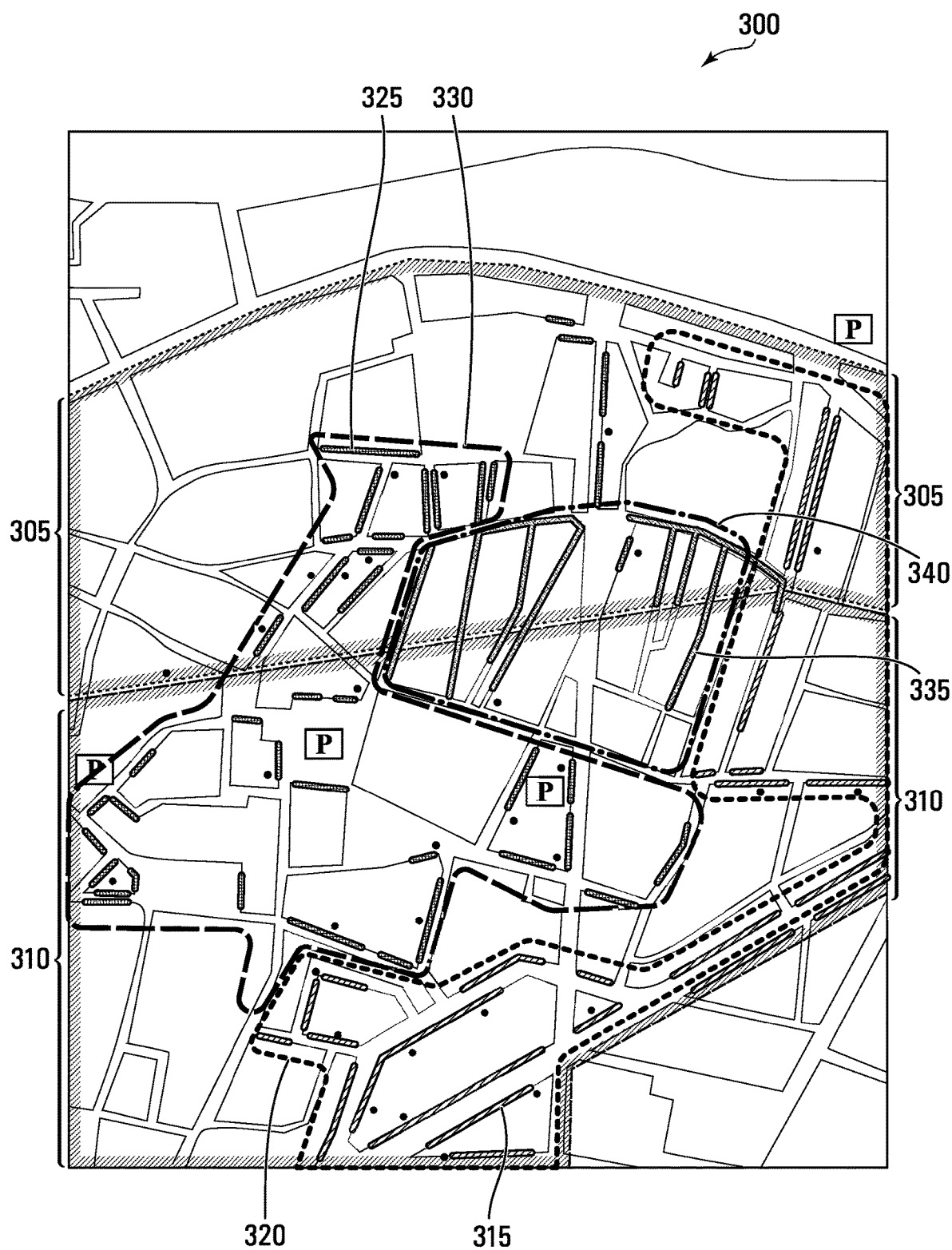
FIG. 3 is a map showing an example of a parking plan for the city Ville d'Agen in southern France.

FIG. 3 is a map and parking plan 300 for Agen (Ville d'Agen), which is a small city in southern France. In general, a municipality, or other type of entity, e.g., a university, may establish a parking policy as part of a curbside management plan. A parking policy is the set of rules (e.g., schedules, parking zones, prices, parking control services, time limits, etc.) that governs how paid parking works in a city. A parking plan 300, as shown in FIG. 3, is one way to visualize the layout of parking zones and other parking policies. A parking policy may be enforced by a municipality using its workforce or through contracting a parking operator, which is an external, i.e., third party, service mandated by the municipality to perform the enforcement on its behalf. A parking rights provider, which is a company that operates a parking application, parking meters, parking rights issuance system, etc., may be mandated by the municipality to collect payment and issue parking rights. The parking rights provider may provide an interface for the municipality or the contracting parking operator to use to conduct the license plate check process and perform the verification for the indication or not of parking rights.

In a typical case, a parking policy is composed of parking zones, streets, street segments, parking rules (i.e., rules based on parking regulations), and parking rights provider configurations. A parking zone is a specified area, or areas, within a city where paid parking is enforced. A city may have several types of zones defined in its parking policy. The parking policy specifies the parking rules assigned to each zone and the schedule, e.g., the days and times, that the parking rules of each zone are in effect. A zone is typically specified in terms of a group of street segments (discussed below), rather than as a geographic area. A parking rule defines a specific parking right verification method and the violation types that might apply when no valid parking right is found. There are two types of parking rules in a typical parking policy: digital parking rights rules, e.g., paid parking via parking meters and/or permits, and "blue zone" rules, e.g., zones in which a vehicle may park for free for a limited period of time or require a permit. Various other types of parking rules are also possible.

A parking rule may be applicable to all streets in a parking zone or only to a subset of street segments or sub-segments (i.e., a segment within a street segment). A street segment is a subdivision, i.e., portion, of a street defined by a street number range (e.g., from 100 to 200) and street number side (e.g., even side, odd side, or both sides) to which a distinct parking rule may be applied. Thus, in practice, a single street may be subject to a number of different parking rules along its entire length. For example, Alexander Fleming is a street of the Technopark in Ville Saint-Laurent. It spans from Marie-Curie avenue to St-Francois road. All street numbers between 1000 and 1500 on Alexander Fleming street may be specified as a street segment such that a different parking zone and/or parking rule may be applied to that segment versus other portions of the street. A street sub-segment is a sub-division of a street-segment. Referring again to the previous example, all even street numbers between 1200 and 1300 on Alexander Fleming may be specified as a sub-segment. For purposes of discussion herein, the term "segment" may be used generically to refer to both segments and sub-segments because, for example, a segment defined in terms of a street number range and a single street side (e.g., odd or even numbers) is essentially a sub-segment.

A typical set of parking policies includes, for example, specifications for paid parking zones, including parking meters and parking permits, and overtime rules establishing parking time limits (e.g., 30 minutes, 1 hour, 2 hours) for unmetered parking spaces. The parking policies may also include time schedules defining periods in which paid parking and/or overtime rules are in effect. For example, paid parking—and parking enforcement—may be in effect only during certain days and times, e.g., weekdays, 8 am to 8 pm. In implementations, the system may be configured to provide an indication to the user, and prevent generation of a citation, if a license plate check is performed outside of the scheduled enforcement period. Moreover, each zone may have an associated schedule indicating when the associated parking policy is in force and the schedule associated with the respective zone of each street-and-zone pair of the set of one or more street-and-zone pairs may be displayed therewith. In some cases, there may be overlap between paid parking zones. For example, there may be zones in which residents are permitted to park which include paid parking in some portion.

The parking plan 300 for Ville d'Agen depicted in FIG. 3 has two main areas—depicted on the map as the upper region 305 and the lower region 310—which constitute two different residential zones. Residents of the upper region 305 are able to purchase parking permits to park in the upper region 305 and residents of the lower region are able to purchase permits to park in the lower region. Within both the upper region 305 and the lower region 310 of the plan 300 map, streets are lined with color-coded lines (depicted in black and white in the figure and identified using reference numbers) indicating different types of on-street paid parking, i.e., on-street paid parking with different parking rules.

For example, in a particular area in the outskirts of the city, some, but not necessarily all, of the streets and/or street sides may be lined with a first type of indicator lines 315 in the plan 300 map to specify that a "green zone" parking policy applies to those streets and/or street sides (i.e., street segments). The area or areas in which the green zone indicator lines 315 are concentrated, e.g., as indicated by the green zone perimeter 320 in the figure, may be referred to as the "green zone" for parking management purposes. Although, as noted above, not every street segment within the green zone perimeter 320 is necessarily subject to the green zone parking rules.

Closer to the center of the city, some streets and/or street sides may be lined with a second type of indicator lines 325 on the plan 300 map to specify that an "orange zone" parking policy applies to those streets and/or street sides (i.e., street segments). The area or areas in which the orange zone indicator lines 325 are concentrated, e.g., as indicated by the orange zone perimeter 330 in the figure, may be referred to as the "orange zone" for parking management purposes. The cost of parking, and parking citations, may be higher in the orange zone than in the green zone to encourage parking outside of the city center and thereby reduce congestion and increase mobility in the central portion of the city. Furthermore, the maximum time for which one can purchase parking may be limited in the orange zone, and the citation validity period may be shorter, such that a vehicle in violation may receive multiple citations in a single day. In addition, the green zone may allow for longer parking times, e.g., three hours, whereas the orange zone may only allow for parking times of, e.g., one hour, to encourage quick turnover of parking spaces, thereby increasing the flow of people who need access to the center of the city for shopping and other commercial purposes.

Other aspects of the parking plan 300 depicted in FIG. 3 include an area in the center of the city in which some streets are overlaid with a third type of indicator lines 335 on the plan 300 map to identify these streets as pedestrian-only and, thus, constituting a "no parking" area. The area or areas in which the purple zone indicator lines 335 are concentrated, e.g., as indicated by the purple zone perimeter 340 in the figure, may be referred to as the "purple zone." The dots on the plan 300 map indicate pay stations which allow for payment of parking fees. In implementations, a municipality like Ville d'Agen may use a third-party, e.g., a private company, to handle the issuance of parking permits and "parking tickets," i.e., an indication of the right to park for a certain period of time (not to be confused with "parking violations," which are issued for vehicles in violation of parking rules).

Figure 4:
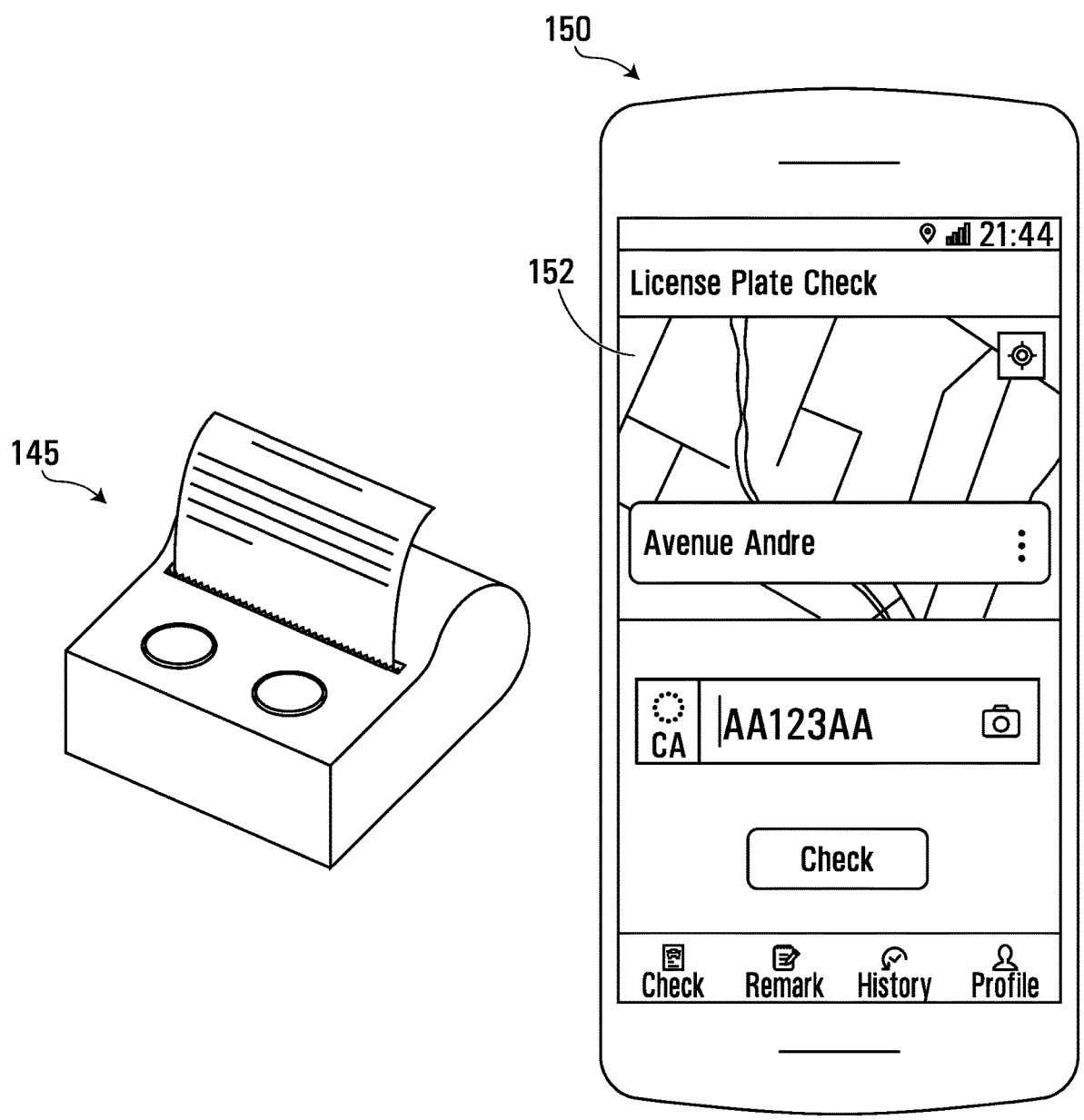
FIG. 4 depicts a mobile device to perform license plate checks and an associated printer to print citations, according to one illustrated embodiment.

FIG. 4 depicts a mobile device 150, e.g., a smartphone or personal digital assistant (PDA), which communicates with the hub 110, and optionally a printer 145 to print hardcopy citations. The mobile device 150, and optionally the printer 145, are carried by parking enforcement officers to perform license plate checks and issue citations based on the parking policies of the municipality. In implementations, the mobile device 150 may be a ruggedized smartphone running a mobile operating system, e.g., the Android operating system, and may have a strap on the back (not shown) for ease of handling and a touchscreen and stylus to interact with the user interface. The mobile device 150 may have a large removable battery pack (not shown) to allow for quick battery replacement. The mobile device 150 may be adapted to be operational in a wide range of environmental conditions. The mobile printer 145, which connects wirelessly with the mobile device 150, e.g., using Bluetooth, is similarly ruggedized and adapted to a wide range of environmental conditions.

Figure 5:
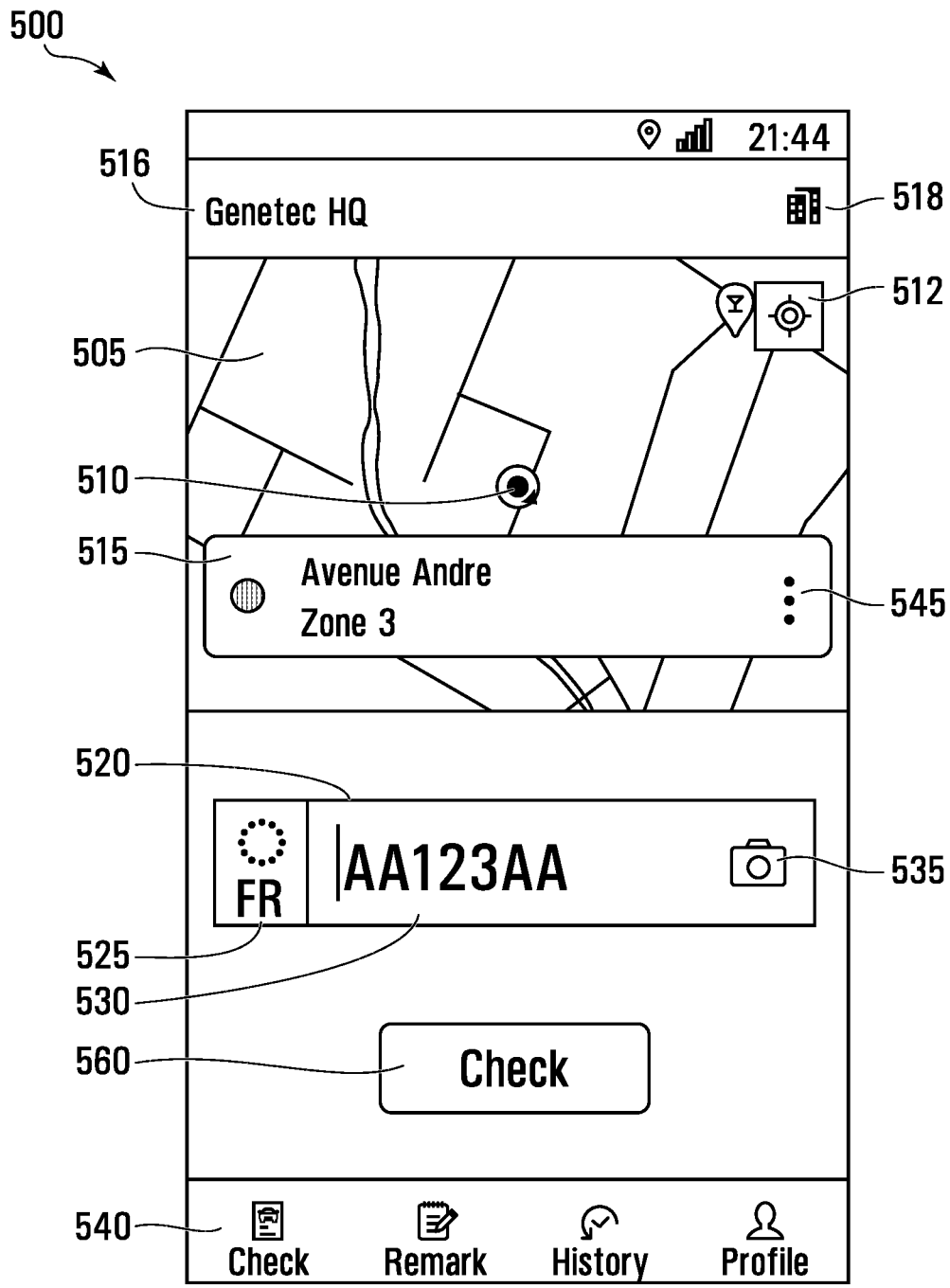
FIG. 5 depicts a user interface screen of the mobile device to input a location and a license plate number to perform a license plate check, according to one illustrated embodiment.

FIG. 5 depicts an example of a user interface screen 500 of the mobile device 150 to input a location and a license plate number to perform a license plate check. The upper portion of the user interface screen shows a map 505 with a dot 510 indicating the parking enforcement officer's current location determined by the mobile device 150 using geolocation, e.g., the Global Positioning System (GPS). The user may request the current location by selecting a current location button 512, or the current location may be automatically determined by geolocation. A street name, e.g., Avenue André, and a zone, e.g., "Zone 3," i.e., a street-and-zone pair, appears in a location entry box 515. In implementations, a selection of a municipality, or other type of jurisdiction, in which to perform the parking policy enforcement may be accepted from the user via the user interface screen 500 of the mobile device 150, and at least a portion of the database containing data relating to the selected municipality may be retrieved, via the network interface, and stored in memory. The name of the municipality may be shown in a band 516 at the top of the interface screen 500. A municipality selection button 518, i.e., icon, to change the municipality may be located, e.g., at the right-hand end of the band 516.

An entry box for the license plate number 520 appears in the lower portion of the screen. The license plate number entry box 520 includes a country indicator 525 (which can be changed by tapping the indicator), a text entry portion 530 into which the license plate number can be manually entered, if desired, and a camera button 535 to activate a license plate number capture using the camera of the mobile device 150, as described in further detail below. Thus, the license plate number of the subject vehicle can be obtained by manual entry by the user via the user interface of the mobile device or determined by processing an image of the license plate of the subject vehicle taken by the user using a camera of the mobile device. In implementations, the image of the license plate may be transmitted to the hub 110 to perform the license plate number recognition. Alternatively, the license plate number recognition may be performed by the mobile device.

The user (e.g., the parking enforcement officer) may tap the three dots 545 on the right-hand side of the license plate number entry box 520 to add "reference pictures" using a camera of the mobile device. The user may take one or more pictures to be associated with the street-and-zone pair. The pictures are appended to all citations issued in the location specified by the street-and-zone pair. If the street-and-zone-pair is changed, the user will be prompted to update the reference pictures. Reference pictures are used as additional evidence on top of what is usually collected for a parking violation. For example, an officer may print a timestamped test ticket at the parking meter and take a picture of it as proof that the meter was in working order at the time a citation was issued. As a further example, the user may take a picture of a nearby parking sign which indicates the schedule and parking rules for the zone. As noted above, a street-and-zone pair appears in the location entry box 515.

To change the current street-and-zone pair, the user taps anywhere on the location entry box 515, other than the three dots 545, to move to a selection screen, as described below with respect to FIG. 6. Alternatively, the user may select one of a number of menu selectors 540 are provided at the bottom of the user interface screen to switch between the license plate check screen, a remarks entry screen, a history screen, and a user profile. Upon confirming the accuracy of the location and license plate number, the user (e.g., the parking enforcement officer) taps the "CHECK" button 560 to initiate the license plate check, which is discussed in further detail below.

Figure 6:
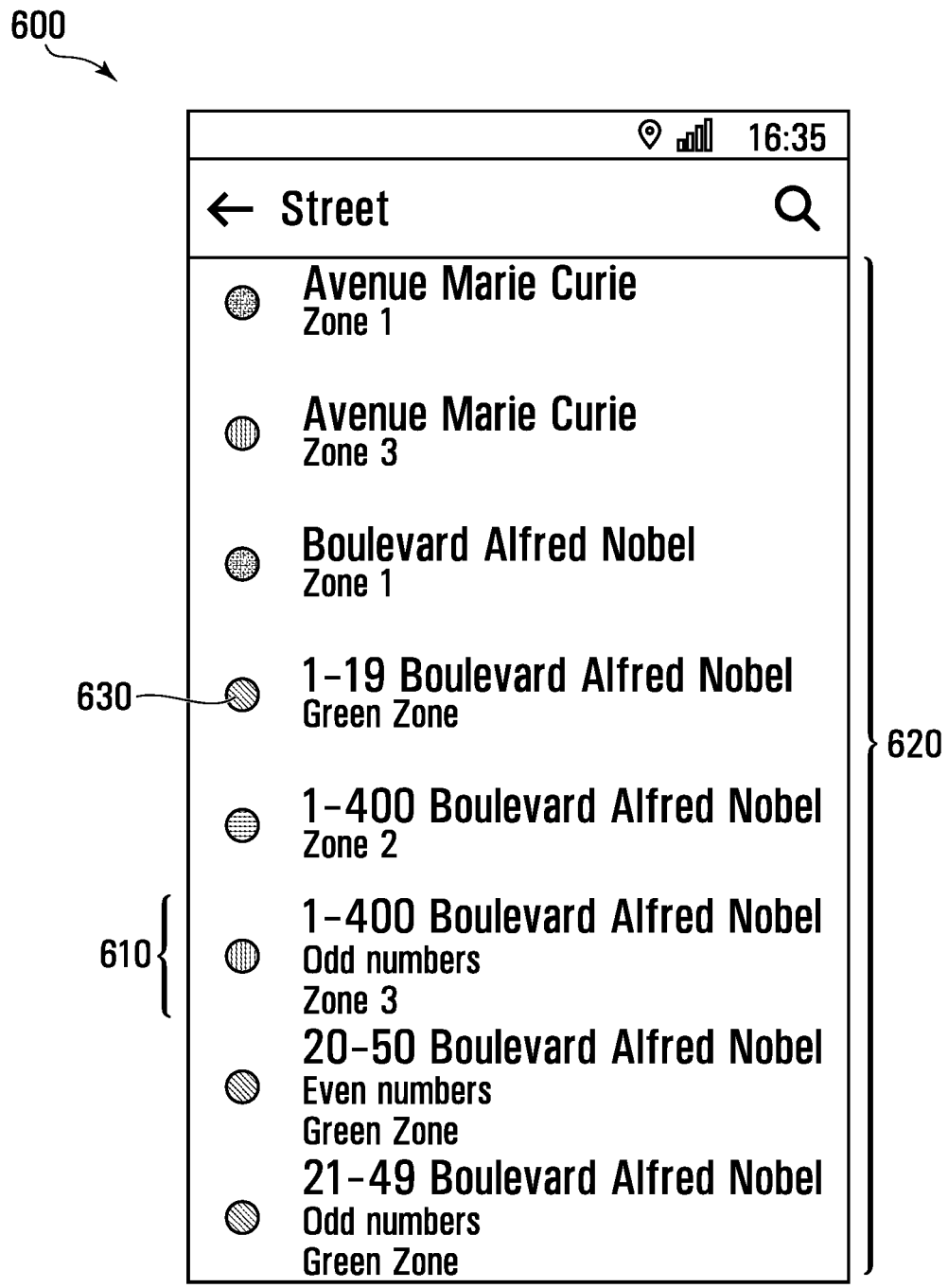
FIG. 6 depicts a user interface screen of the mobile device to select a street-and-zone pair from a set of street-and-zone pairs to perform a license plate check, according to one illustrated embodiment.

FIG. 6 depicts a user interface screen 600 of the mobile device 150 (see FIG. 3) to select a street-and-zone pair 610 from a set 620 of street-and-zone pairs to perform a license plate check. This allows for presenting a set 620 of one or more street-and-zone pairs to a user via the user interface 600 displayed on a display 152 (see FIG. 3) of the mobile device 150. The display 152 may be any suitable display device, for example, such as a light emitting diode (LED) display device, a liquid crystal display (LCD) display device, or the like. The set 620 of street-and-zone pairs is taken from a database containing street and zone data for the particular municipality (or other type of entity), which may be based on the current location of the user. Thus, there is a retrieval from the database comprising street and zone data, of a set of one or more street-and-zone pairs. The database containing street and zone data may be stored by the mobile device 150 and/or the hub 110. The database containing street and zone data may comprise a plurality of street-and-zone pairs. The set 620 of one or more street-and-zone pairs is filtered from the street and zone data based at least in part on the determined location of the mobile device. The filtering may be performed by the mobile device 150 and/or by the hub 110.

In some implementations, the database comprising street and zone data may be downloaded to the mobile device 150 from the hub 110 (e.g., prior to patrol by an officer with the mobile device 150), and thus the retrieval of the set 620 of one or more street-and-zone pairs may occur at the mobile device 150. In some implementations, the mobile device 150 may send a query to the hub 110 (e.g., with the location of the mobile device or at least a partial street name) and then obtain the set 620 of one or more street-and-zone pairs from the hub 110, and thus the retrieval of the set 620 of one or more street-and-zone pairs may be from the hub 110. In some implementations, the database comprising street and zone data may be partially downloaded to the mobile device 150 from the hub 110 based on an initial location of the mobile device at the time of the download or based on a user provided location (e.g., a selected municipality), and then filtered at the mobile device 150 based on a current location of the mobile device 150 as the mobile device changes location.

Each zone has an associated parking rule or rules, as discussed above with respect to FIGS. 2 and 3. A particular street, e.g., Boulevard Alfred Nobel, may have more than one type of parking zone proximate the user's current location. In such a case, the street is listed in multiple entries in the scrollable list, i.e., set 620, of street-and-zone pairs —each time in conjunction with a different zone, e.g., Boulevard Alfred Nobel and Zone 1; Boulevard Alfred Nobel and Green Zone; and Boulevard Alfred Nobel and Zone 2. Other instances of Boulevard Alfred Nobel in the set 620 of street-and-zone pairs indicate a street number range (i.e., 1-19, 1-400, 20-50, and 21-49) and also may include a street side indicator (i.e., odd or even). The listing may include color-coded dots 630 to more easily identify zones which are associated with a particular color. The user can quickly tap on the street-and-zone pair 610 in which the subject vehicle is currently parked without having to enter text and/or without having to separately enter a street and a zone.

Figure 7:
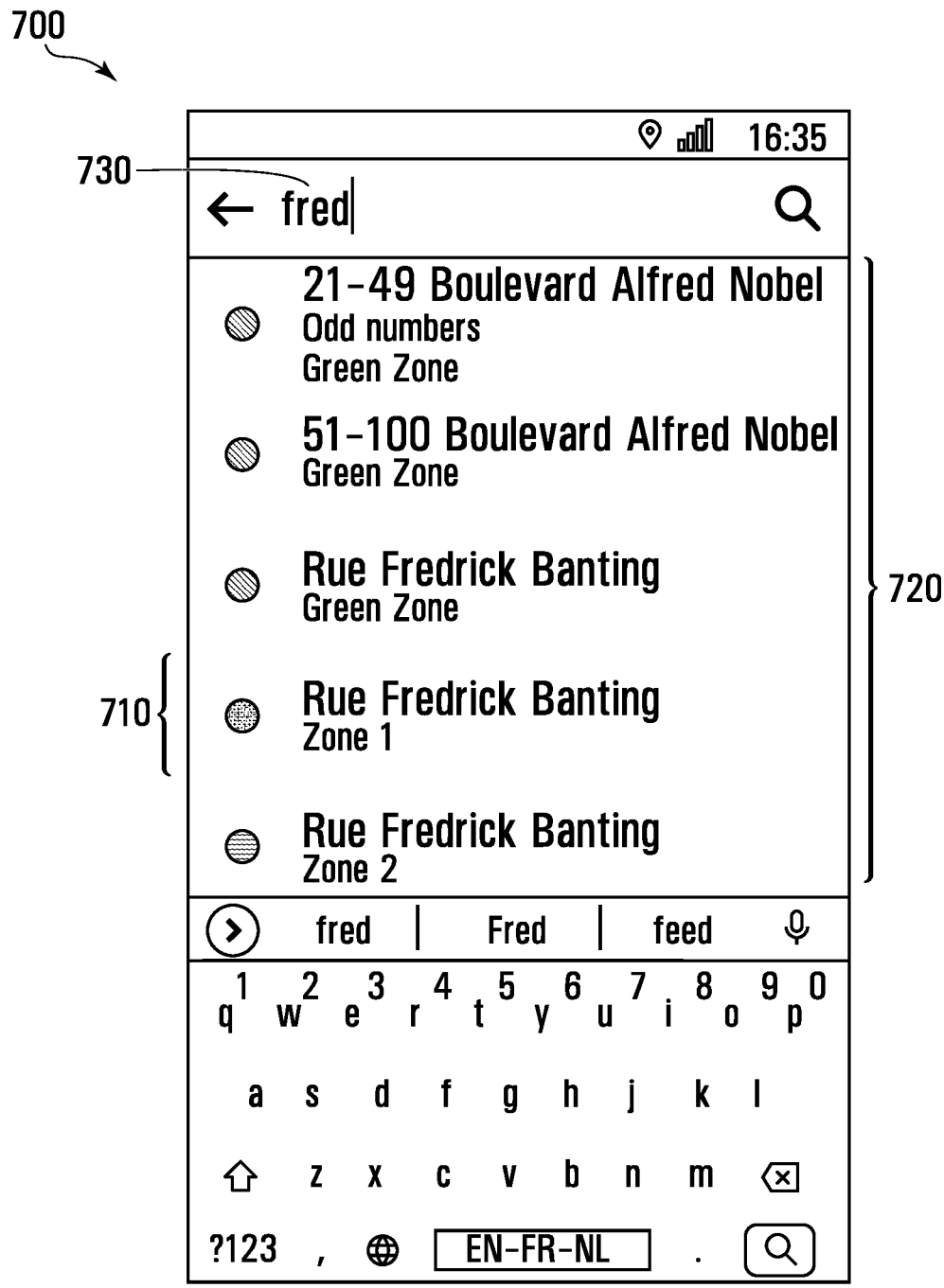
FIG. 7 depicts a user interface screen of the mobile device to search a set of street-and-zone pairs to facilitate selection of a street-and-zone pair to perform a license plate check, according to one illustrated embodiment.

FIG. 7 depicts a user interface screen 700 of the mobile device 150 to search a set 720 of street-and-zone pairs to facilitate selection of a street-and-zone pair 710 to perform a license plate check. Although, as noted above, the user can quickly tap on the street-and-zone pair 710 in which the subject vehicle is currently parked without having to enter text, a search box 730 may be provided, e.g., at the top of the screen 700 above the list, i.e., set 720 of street-and-zone pairs, to allow entry of one or more characters and/or numbers, e.g., a portion of a street name, to filter the list of street-and-zone pairs. In the example depicted, the letters "fred" have been entered in the search box 730 and this has filtered the list down to anything containing those letters, e.g., Rue Alfred Nobel and Rue Frederick Banting. Numbers may also be entered to find street-and-zone pairs associated with particular address numbers or address ranges. The user then selects the correct street-and-zone pair 710, which in this example is Rue Frederick Banting, Zone 1, by tapping on the corresponding entry in the listing. Thus, the app accepts from the user, via the user interface, a selection of a street-and-zone pair 710 of the set 720 of one or more street-and-zone pairs.

Figure 8:
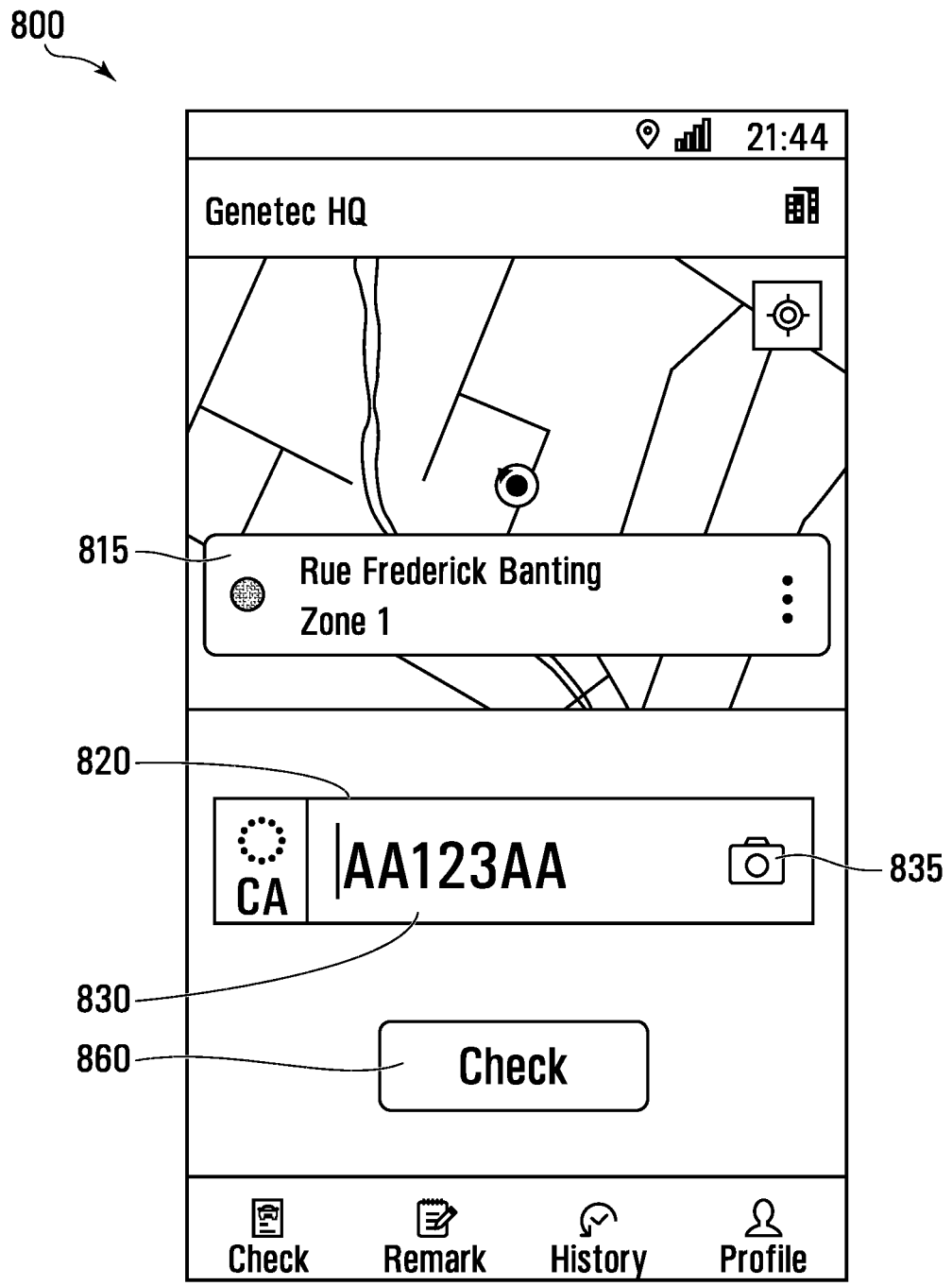
FIG. 8 depicts a user interface screen of the mobile device to input a location, a location having been selected from a list of street-and-zone pairs, and a license plate number to perform a license plate check, according to one illustrated embodiment.

FIG. 8 depicts a user interface screen 800 of the mobile device 150 to input a location and a license plate number, as in the example user interface screen shown in FIG. 5. A street, e.g., Rue Frederick Banting, and a zone, e.g., "Zone 1," i.e., a street-and-zone pair, has been selected by the user from a set of street-and-zone pairs, as explained above, and the selected street-and-zone pair appears in a location entry box 815. A license plate number of the subject vehicle has been entered in the text entry portion 830 of the license number entry box 820 or, as noted above, the user may have tapped the camera button 835 (i.e., icon) on the touchscreen to activate license plate number capture using the camera of the mobile device 150. Upon confirming the accuracy of the location and license plate number, the user (e.g., the parking enforcement officer) taps the "CHECK" button 860 to initiate the license plate check, which is discussed in further detail below.

Figure 9:
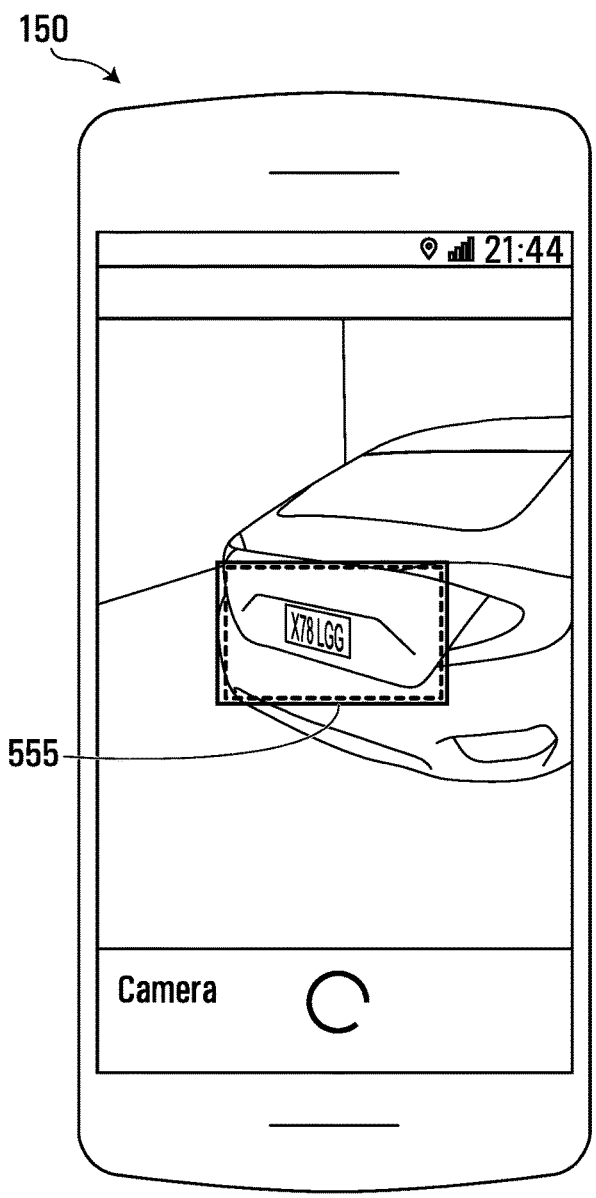
FIG. 9 depicts a camera preview screen of the mobile device providing a target zone indicator to facilitate aiming of the camera at a license plate to capture a license plate number to perform a license plate check, according to one illustrated embodiment.

FIG. 9 depicts a camera preview screen of the mobile device 150 providing a target zone indicator 555 to facilitate aiming of the camera at a license plate to capture a license plate number. The user aims the camera of the mobile device 150 so that the license plate is within the target zone indicator 555 and taps a button to take a photo. In implementations, the app may control the mobile device 150 to automatically take the photo upon detecting the presence of a license plate within the target zone, in which case the user merely aims the camera so that the license plate is within the target zone. The photo is analyzed using automatic license plate recognition (ALPR) to produce a corresponding license plate number. In implementations, the photo is processed at the mobile device 150 using ALPR to determine the license plate number. In implementations, the photo may be transmitted to the hub 110 to be processed using ALPR to determine the license plate number. Thus, the app receives a license plate number of a subject vehicle proximate the location of the mobile device 150. The license plate number resulting from ALPR is filled in the license number entry box 820 (see FIG. 8) for review by the user. In implementations, the license plate check may be automatically triggered if the license plate number recognition results in a confidence score higher than a specific threshold, i.e., the license plate check may be performed without the user pressing the "CHECK" button 860 (see FIG. 8).

Figure 10:
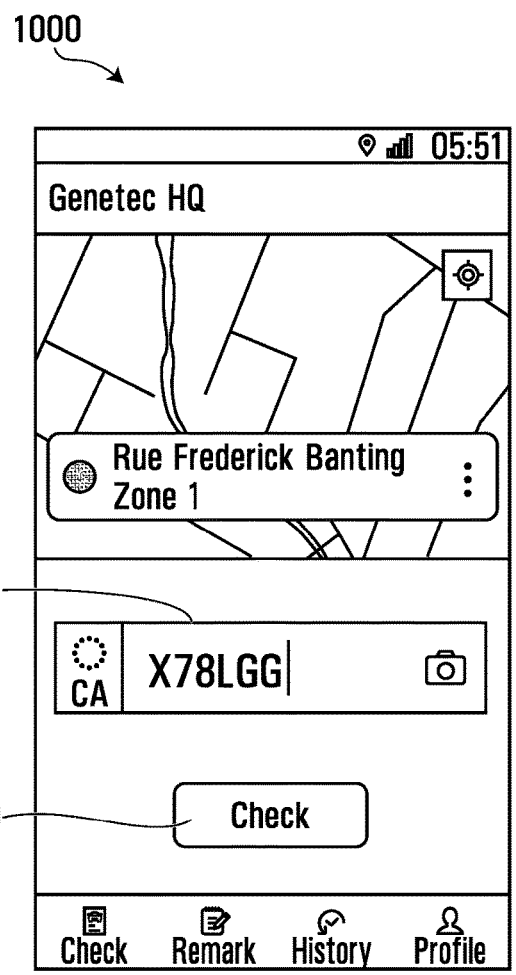
FIG. 10 depicts a user interface screen of the mobile device to input a location and a license plate number, the license plate number having been filled in after automatic license plate recognition, to perform a license plate check.

FIG. 10 depicts an example of a user interface screen 1000 of the mobile device 150 to input a location and a license plate number, as in the example user interface screens shown in FIGS. 5 and 8. In the example depicted, a location, Rue Frederick Banting, has been selected by the user from a list of street-and-zone pairs and the license plate number, X78LGG, has been filled in in the entry box for the license plate number 1020 after automatic license plate recognition, as explained above. Upon confirming the accuracy of the location and license plate number, the user (e.g., the parking enforcement officer) taps the "CHECK" button 560 to initiate the license plate check, which is discussed in further detail below.

In some implementations, when the check button 560 is selected by the user, the license plate number and the selected street-and-zone pair is transmitted from the mobile device 150 to the hub 110 in order to perform the license plate check. Then, the hub 110 may obtain existing parking rights, if any, for the subject vehicle with the license plate number, determine if a violation has occurred based on any existing parking rights and the selected street-and-zone pair, and transmits infraction information for the detected violation to the mobile device 150. Alternatively, in some implementations, when the check button 560 is selected by the user, the license plate number is transmitted from the mobile device 150 to the hub 110. Then, the hub may obtain the existing parking rights, if any, for the subject vehicle and transmit any existing parking rights to the mobile device 150, which may then determine if a violation has occurred based on any existing parking rights and the selected street-and-zone pair.

Figure 11:
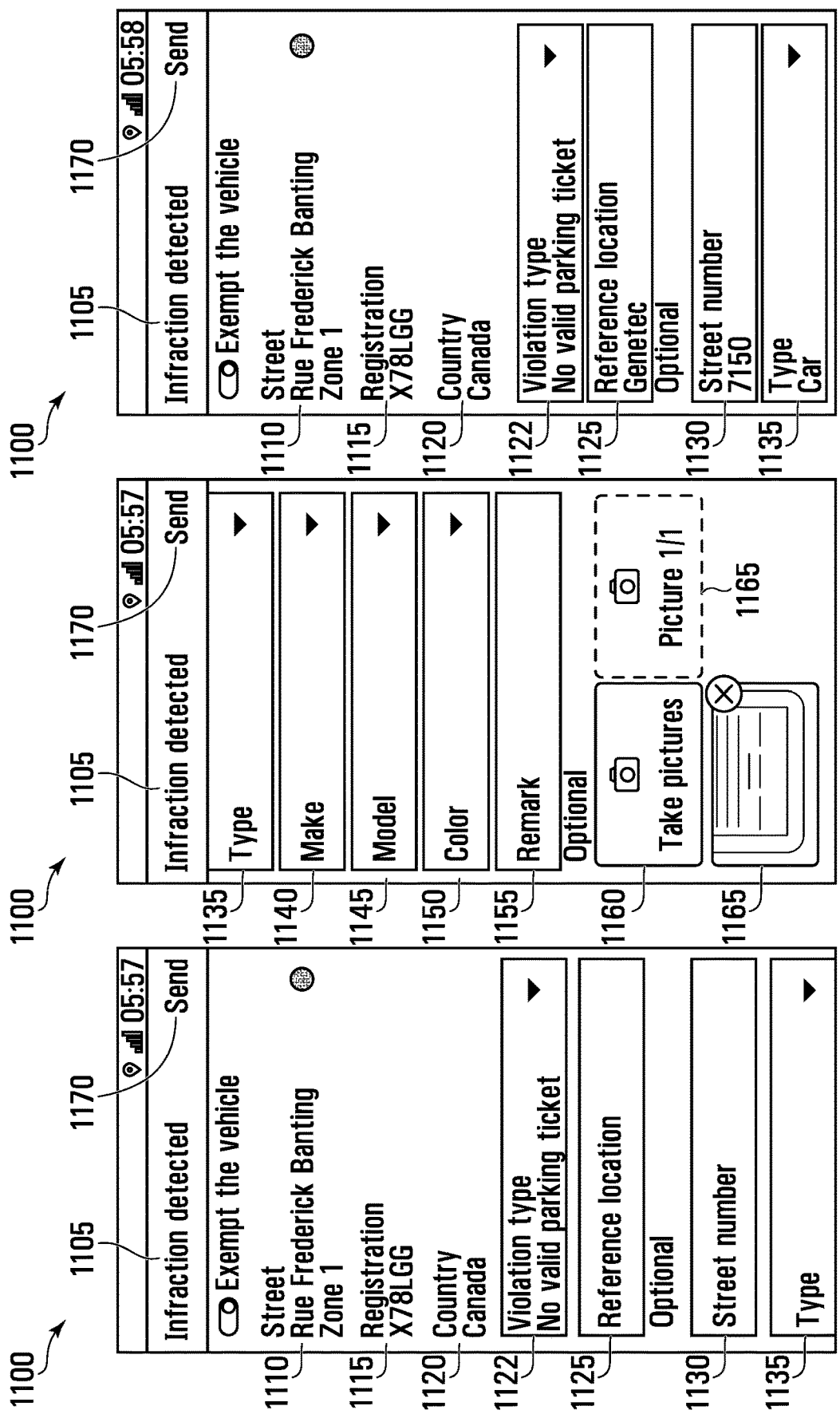
FIGS. 11A-11C depict a user interface screen of the mobile device to provide a result of the license plate check and to input vehicle details and evidentiary photos to initiate generation of a citation, according to one illustrated embodiment.

FIGS. 11A-11C depict an example of a user interface screen 1100 of the mobile device 150 to provide a result of the license plate check and to input vehicle details and evidentiary photos to initiate generation of a citation. The figures represent views of the user interface screen 1100 as it is scrolled (FIG. 11B) and as information is filled in (FIG. 11C). A status band 1105 at the top of the screen indicates "Infraction detected," which means that the result of the license plate check was an infraction, i.e., the subject vehicle was found to be in violation of one or more parking rules. The user interface screen 1100 presents the street-and-zone pair 1110, the license plate number 1115, and the license plate country 1120 and provides a number of text entry boxes and/or pull-down menus for entry of details of the subject vehicle.

There is a pull-down menu for selection of a violation type 1122. When a violation is detected as the result of failing checks on one or multiple parking rules, the hub 110 may return a selection of one or multiple violation types. A violation type provides additional context to the citation evidence package. For example, if a vehicle operator did not pay enough to park, the selected violation type may be "ticket expired," i.e., permit expired. This information is also printed on the citation (when citations are printed) and used in the reporting of statistics.

There is a text entry box for a reference location 1125, a text entry box for a street number 1130, a pull-down menu for the type of vehicle 1135 (e.g., 4×4, bus, car, motorcycle, etc.), a pull-down menu for the vehicle make 1140 (e.g., Honda), a pull-down menu for the vehicle model 1145 (e.g., Civic), a pull-down menu for color 1150, and a text entry box for a remark 1155. At the bottom of the user interface screen 1100, there is a "take pictures" button 1160 to initiate the taking of evidentiary photos and thumbnails 1165 of photos which have been taken (see FIG. 11B). The user clicks the "take pictures" button 1160 to open a camera preview screen, discussed below, to take context photos of the subject vehicle and its surroundings for evidentiary purposes. FIG. 11C shows the input form with the violation type, reference location, street number, type fields filled in. The user taps the "send" button 1170 to send the data to the hub 110, which initiates creation of a citation at the citation server 170 (e.g., the hub 110 transmits information on the detected violation to the citation server 170, and the citation server 170 then generates the citation based on the received information on the detected violation).

Figure 12:
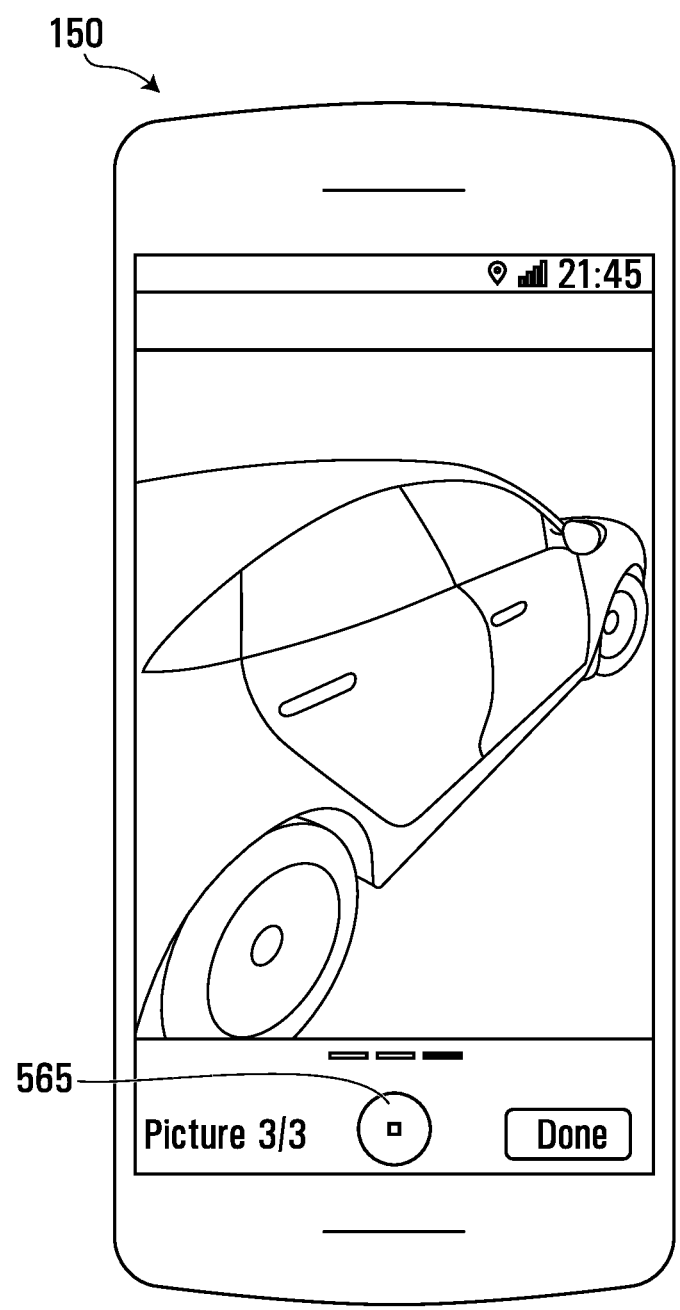
FIG. 12 depicts a camera preview screen of the mobile device to take evidentiary photos to be sent to the hub in the request to initiate generation of a citation, according to one illustrated embodiment.

FIG. 12 depicts a camera preview screen of the mobile device 150 to take evidentiary photos to be sent to the hub 110 in the request to initiate generation of a citation. The camera preview screen provides a button 565 for the user to tap to take a photo (and, in implementations, is then given an option to keep or retake/delete the photo). The camera preview screen also provides an indication of how many photos have been taken out of a total number of photos, e.g., three photos. In implementations, the total number of photos may be set according to the requirements of the parking policies of the municipality, which may establish a minimum number of evidentiary photos required for each citation. Thus, the app accepts input of one or more evidentiary photos taken by the user using a camera of the mobile device, and these evidentiary photos are included in the citation data output via the network interface to initiate generation of a citation.

Figure 13A:
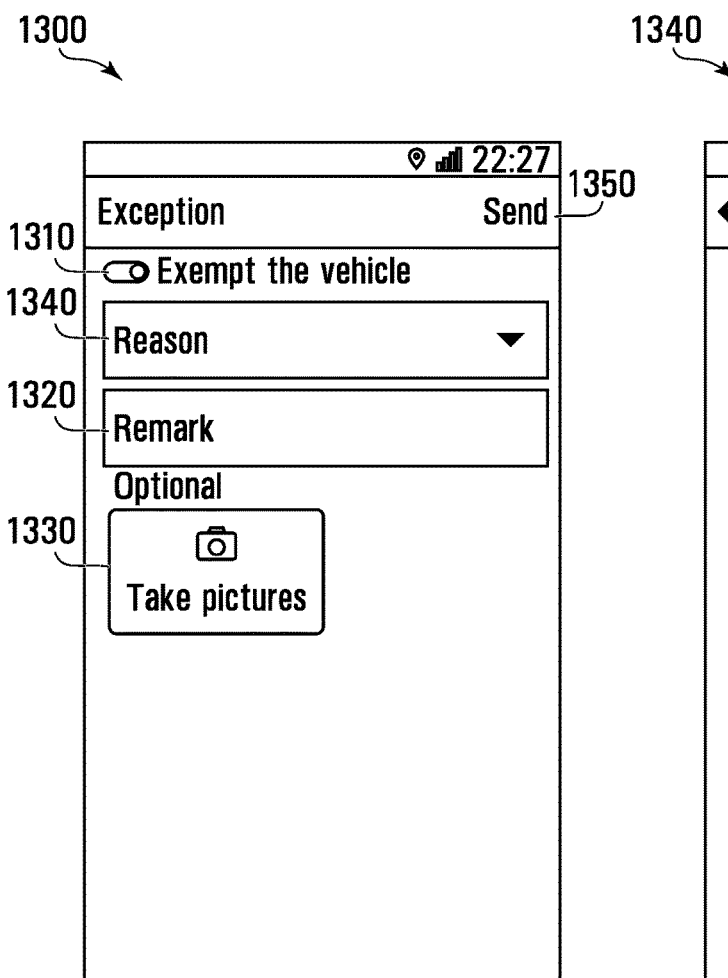
FIGS. 13A and 13B depict a user interface screen of the mobile device and a pull-down menu to exempt a vehicle after a license plate check results in detection of a violation, according to one illustrated embodiment.
Figure 13B:

FIGS. 13A and 13B depict a user interface screen of the mobile device and a pull-down menu to exempt a vehicle after a license plate check results in detection of a violation. An officer may choose to exempt a vehicle from a citation for a variety of pre-defined reasons, such as a broken parking meter, the vehicle is a municipal or police vehicle, etc. The exemption may be made on a user interface screen 1300, e.g., by tapping on a button or slider 1310. The user interface screen 1300 may include a text entry field 1320 for entering a remark and a "take pictures" button 1330 to open a camera preview screen to take evidentiary photos to support the decision to exempt the vehicle, such as a photo of a disabled parking permit. The user interface 1300 also provides a pull-down menu 1340 (see FIG. 13B) from which to select a reason for the exemption, such as, for example, disabled parking permit, municipality, national police, etc. The user presses the "send" button 1350 to complete the exemption and submit the information to the hub 110.

Figure 14:
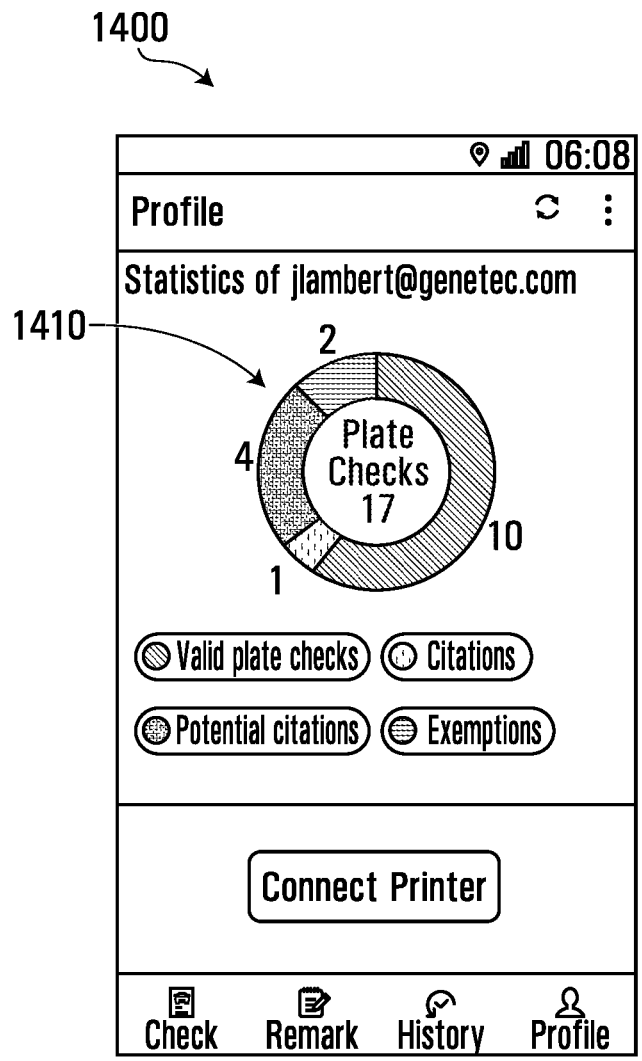
FIG. 14 depicts a profile screen of the mobile device to provide statistics for citations initiated by the user, according to one illustrated embodiment.

FIG. 14 depicts a profile screen 1400 of the mobile device providing statistics for citations initiated by the user (e.g., parking enforcement officer). For example, the profile screen may present a graph 1410 showing a total number of plate checks run in a specific time period (e.g., that day) broken down into valid plate checks (i.e., no violation), citations, potential citations (i.e., plate checks which returned a violation indication but a citation was not initiated by the user), and exemptions.

Figure 15:
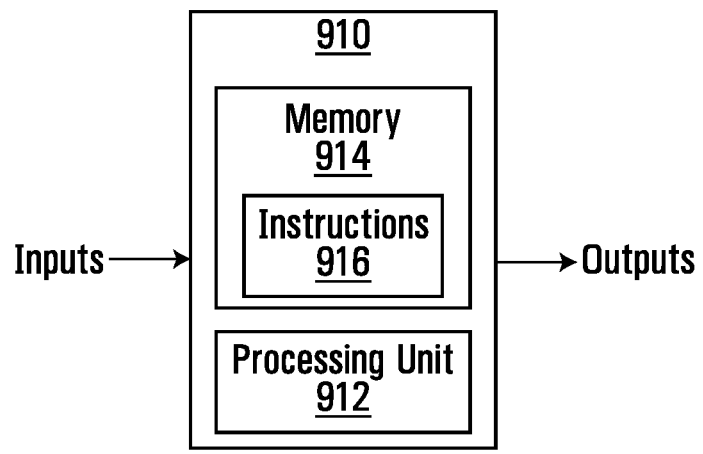
FIG. 15 is a block diagram of an example of a computing device usable to implement the methods described herein.

With reference to FIG. 15, the method(s) described herein may be implemented by a computing device 910, comprising a processing unit 912 and a memory 914 which has stored therein computer-executable instructions 916. The hub 110, various front-end subsystems of the parking policy enforcement system 120, various back-end subsystems of the parking citation management system 160, the citation server 170, and/or the mobile device 150, as well as other components described herein, may each be implemented by and/or comprise a computing device, such as the computing device 910. The processing unit 912 may comprise any suitable devices configured to implement the method(s) described herein such that instructions 916, when executed by the computing device 910 or other programmable apparatus, may cause the method(s) described herein to be executed. The processing unit 912 may comprise, for example, any type of general-purpose or specialized microprocessor or microcontroller, a digital signal processing (DSP) processor, a central processing unit (CPU), a graphical processing unit (GPU), an integrated circuit, a field programmable gate array (FPGA), a reconfigurable processor, other suitably programmed or programmable logic circuits, or any combination thereof. The processing unit 912 may be referred to as a "processor" or a "computer processor".

The memory 914 may comprise any suitable machine-readable storage medium. The memory 914 may comprise non-transitory computer readable storage medium, for example, but not limited to, an electronic, magnetic, optical, electromagnetic, infrared, or semiconductor system, apparatus, or device, or any suitable combination of the foregoing. The memory 914 may include a suitable combination of any type of computer memory that is located either internally or externally to device, for example random-access memory (RAM), read-only memory (ROM), compact disc read-only memory (CDROM), electro-optical memory, magneto-optical memory, erasable programmable read-only memory (EPROM), and electrically-erasable programmable read-only memory (EEPROM), Ferroelectric RAM (FRAM) or the like. Memory 914 may comprise any storage means (e.g., devices) suitable for retrievably storing machine-readable instructions 916 executable by processing unit 912.

The methods and systems described herein may be implemented in a high-level procedural or object-oriented programming or scripting language, or a combination thereof, to communicate with or assist in the operation of a computer system, for example the computing device 910. Alternatively, or in addition, the methods and systems described herein may be implemented in assembly or machine language. The language may be a compiled or interpreted language. Program code for implementing the methods and systems described herein may be stored on a storage media or a device, for example a ROM, a magnetic disk, an optical disc, a flash drive, or any other suitable storage media or device. The program code may be readable by a general or special-purpose programmable computer for configuring and operating the computer when the storage media or device is read by the computer to perform the methods described herein. Embodiments of the methods and systems described herein may also be considered to be implemented by way of a non-transitory computer-readable storage medium having a computer program stored thereon. The computer program may comprise computer-readable instructions which cause a computer, or in some embodiments the processing unit 912 of the computing device 910, to operate in a specific and predefined manner to perform the methods described herein.

Computer-executable instructions may be in many forms, including program modules, executed by one or more computers or other devices. Generally, program modules include routines, programs, objects, components, data structures, etc., that perform particular tasks or implement particular abstract data types. Typically, the functionality of the program modules may be combined or distributed as desired in various embodiments.

Figure 16:
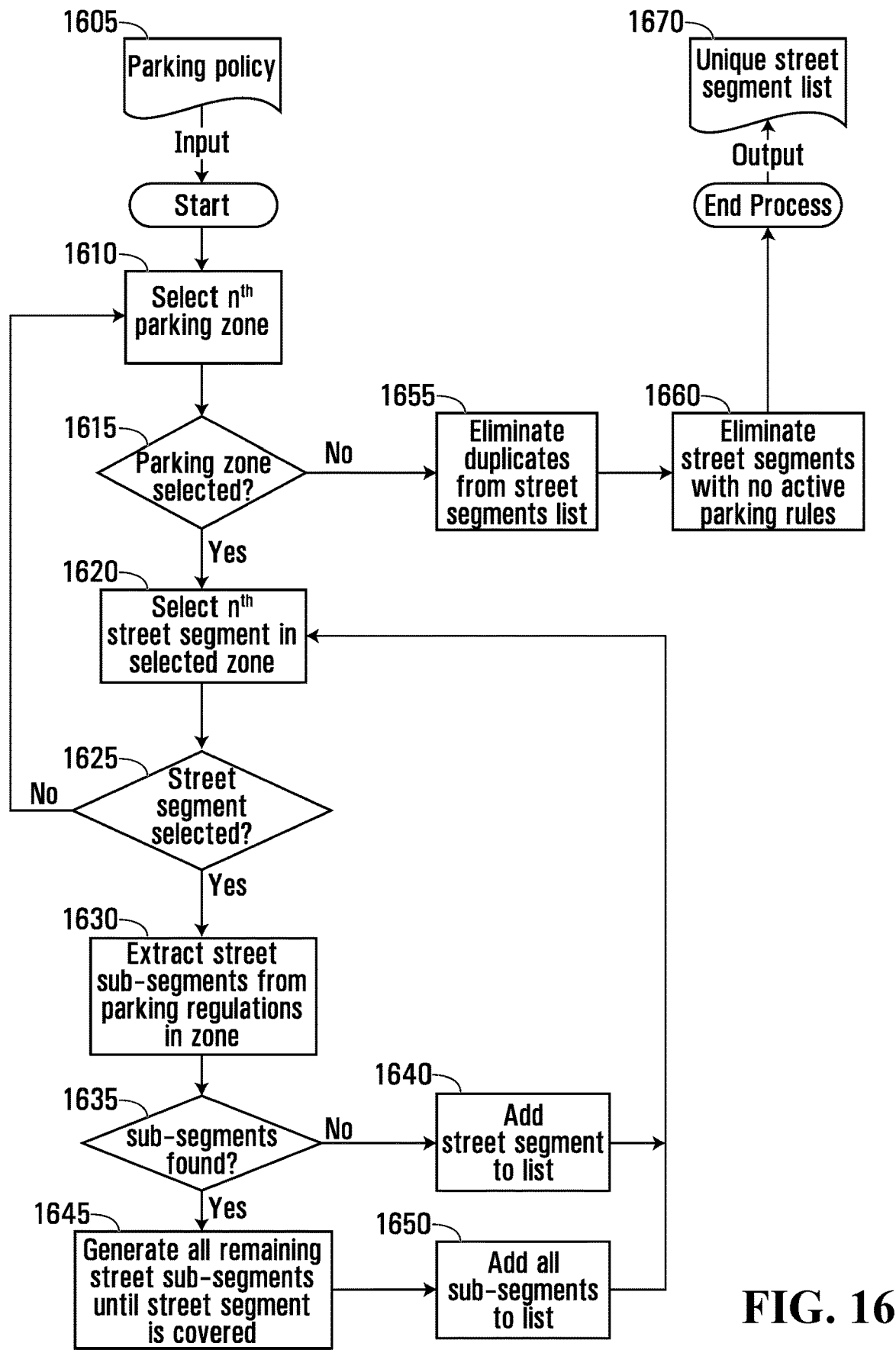
FIG. 16 is a flow chart of a method of generating a list of street segments based on a parking policy, according to one illustrated embodiment.

FIG. 16 is a flow chart of a method 1600 of generating a list of street segments, e.g., street-and-zone pairs, based on a parking policy. As discussed above, e.g., with respect to FIG. 3, a parking policy is composed of parking zones, streets, street segments, parking rules (i.e., rules based on parking regulations), and parking rights provider configurations. The parking policy specifies the parking rules assigned to each zone and the schedule according to which the parking rules of each zone are in effect. A parking rule defines a specific parking right verification method and the violation types that might apply when no valid parking right is found. A zone is specified in terms of a group of street segments which are sub-divisions of a street defined by a street number range and/or street number side (e.g., both, even, odd) that identify a specific portion of the street.

As discussed above, e.g., with respect to FIG. 6, the parking enforcement officer selects a street-and-zone pair from a set of street-and-zone pairs to perform a license plate check. The set of street-and-zone pairs is taken from a database comprising a plurality of street-and-zone pairs. The set of one or more street-and-zone pairs is filtered from the street and zone data based at least in part on the determined location of the mobile device. The filtering may be performed by the mobile device 150 and/or by the hub 110.

Using the configuration portal 130 (see FIG. 1), a system administrator captures the parking policy 1605 by defining the municipality, the parking zones, the streets, street segments, and applicable parking rules & schedules via a user interface adapted to capture and manipulate this information in a simplified way. Once this information is entered, a list, i.e., a set, of street-and-zone pairs is generated using the method 1600 depicted. The parking zones of the parking policy 1605 are iteratively selected for processing, so the $n^{th}$ parking zone is selected (1610), the parking zone selection is confirmed (1615), i.e., there is a further parking zone to iterate, and if affirmative, the street segments in the zone are iteratively selected, i.e., the nth street segment in the selected zone is selected (1620).

The street segment selection is confirmed (1625), and if affirmative, street sub-segments (e.g., odd or even street side designations) are extracted (1630) from the parking regulations, i.e., parking rules, of the zone. It is determined whether sub-segments have been found for the selected street segment (1635). If not, the selected street segment is added to the list (1640) (i.e., the set of street-and-zone pairs). If sub-segments are found, then all remaining street sub-segments are generated until the street segment is covered (1645). For example, if the street sub-segment found in the parking policy is odd-numbered street addresses for a particular street address number range, then a sub-segment for the even-numbered street addresses is created. The sub-segments extracted from the parking policy and the sub-segments generated to "fill out" the specification of the parking policy (in 1645) are added to the list (1650).

The method continues iterating over the parking zones of the parking policy 1605 until the parking zone selection is negative (1615), i.e., all of the parking zones have been processed. The list of street segments is processed to eliminate duplicates (1655), and street segments with no active parking rules are eliminated (1660). The list of unique street segments, e.g., street-and-zone pairs, is output (1670). In implementations, the set of street-and-zone pairs is newly generated by the hub 110 when requested at login from the mobile device 150. As explained above, the entire list street-and-zone pairs may be displayed in scrollable form, but the officer can reduce the list by manually typing at least a portion of a street name, a zone name, and/or a street number or number range into a search input box 730 (see FIG. 7).

The foregoing detailed description has set forth various implementations of the devices and/or processes via the use of block diagrams, schematics, and examples. Insofar as such block diagrams, schematics, and examples contain one or more functions and/or operations, it will be understood by those skilled in the art that each function and/or operation within such block diagrams, flowcharts, or examples can be implemented, individually and/or collectively, by a wide range of hardware, software, firmware, or virtually any combination thereof. Those of skill in the art will recognize that many of the methods or algorithms set out herein may employ additional acts, may omit some acts, and/or may execute acts in a different order than specified. The various implementations described above can be combined to provide further implementations.

These and other changes can be made to the implementations in light of the above-detailed description. In general, in the following claims, the terms used should not be construed to limit the claims to the specific implementations disclosed in the specification and the claims but should be construed to include all possible implementations along with the full scope of equivalents to which such claims are entitled. Accordingly, the claims are not limited by the disclosure.

What is claimed is:

1. A method of performing parking policy enforcement using a mobile device having one or more processors, memory, and a network interface, the method comprising:
   presenting a set of street-and-zone pairs via a user interface displayed on a display of the mobile device, each street-and-zone pair identifying a street and a zone within which at least a portion of the street is located, the street and the zone, in combination, being associated with one or more parking rules;
   receiving, via the user interface, a selection of a street-and-zone pair of the set of street-and-zone pairs, the selected street-and-zone pair corresponding to a location of a subject vehicle;
   obtaining a license plate number of the subject vehicle;
   transmitting, via the network interface, the license plate number to a remote parking enforcement system;
   determining parking rights of the subject vehicle based at least in part on the license plate number;
   determining whether the subject vehicle is in violation of one or more parking rules associated with the street and the zone, in combination, of the selected street-and-zone pair based at least in part on the parking rights of the subject vehicle; and
   presenting a violation indication via the user interface, the violation indication indicating whether the subject vehicle is in violation of the one or more parking rules associated with the street and the zone, in combination, of the selected street-and-zone pair.

2. The method of claim 1, wherein said determining parking rights of the subject vehicle based at least in part on the license plate number comprises receiving, via the network interface, parking rights information for the subject vehicle from the remote parking enforcement system.

3. The method of claim 1, further comprising:
   transmitting, via the network interface, the selected street-and-zone pair to the remote parking enforcement system,
   wherein said determining whether the subject vehicle is in violation of one or more parking rules associated with the street and the zone, in combination, of the selected street-and-zone pair comprises receiving, via the network interface, the violation indication.

4. The method of claim 1, wherein each street-and-zone pair identifies a segment of the street corresponding to said at least a portion of the street located within the zone, and wherein the segment of the street and the zone, in combination, are associated with the one or more parking rules.

5. The method of claim 4, wherein the segment of the street corresponding to said at least a portion of the street located within the zone corresponds to a street number or number range of the street.

6. The method of claim 4, wherein the segment of the street corresponding to said at least a portion of the street located within the zone corresponds to a side of the street.

7. The method of claim 4, wherein in said presenting the set of street-and-zone pairs via the user interface displayed on the display of the mobile device, the zone of each street-and-zone pair is identified in conjunction with an indication of at least one of: a street number or number range corresponding to the segment of the street; and a side of the street corresponding to the segment of the street.

8. The method of claim 1, wherein in said presenting a set of street-and-zone pairs via a user interface displayed on a display of the mobile device, the zone of each street-and-zone pair is identified using a color code.

9. The method of claim 1, further comprising:
   determining a location of the mobile device; and
   filtering a plurality of street-and-zone pairs based at least in part on proximity to the determined location of the mobile device to obtain the set of street-and-zone pairs.

10. The method of claim 9, wherein the location of the mobile device is determined by geolocation.

11. The method of claim 10, wherein the location of the mobile device is a GPS location of the mobile device.

12. The method of claim 9, wherein filtering the plurality of street-and-zone pairs based at least in part on proximity to the determined location of the mobile device comprises:
   identifying one or more street-and-zone pairs in the plurality of street-and-zone pairs that are within a distance of the determined location of the mobile device; and
   including the identified one or more street-and-zone pairs in the set of street-and-zone pairs; and
   wherein the set of street-and-zone pairs excludes the street-and-zone pairs of the plurality of street-and-zone pairs that are beyond the distance.

13. The method of claim 9, wherein filtering the plurality of street-and-zone pairs based at least in part on proximity to the determined location of the mobile device comprises sorting the plurality of street-and-zone pairs according to the street-and-zone pairs nearest to the determined location of the mobile device to obtain the set of street-and-zone pairs.

14. The method of claim 1, further comprising:
   receiving, via the user interface, a user input; and
   filtering the set of street-and-zone pairs based at least in part on the user input.

15. The method of claim 1, wherein said obtaining the license plate number comprises receiving, via the user interface, a user input.

16. The method of claim 1, wherein said obtaining the license plate number comprises:
   capturing, by the mobile device, an image of the license plate; and
   determining the license plate number from the image.

17. The method of claim 1, wherein said obtaining the license plate number comprises:
   capturing, by the mobile device, an image of the license plate;
   transmitting the image of the license plate, via the network interface, to the remote parking enforcement system; and
   receiving, via the network interface, the license plate number from the remote parking enforcement system.

18. The method of claim 1, further comprising:
   receiving evidentiary information relating to the subject vehicle; and
   transmitting, via the network interface, to the remote parking enforcement system the evidentiary information.

19. The method of claim 18, wherein the evidentiary information comprises user-input information identifying one or more characteristics of the subject vehicle.

20. The method of claim 18, wherein the evidentiary information comprises photos taken using a camera of the mobile device.

21. The method of claim 1, further comprising:
   receiving, via the network interface, from the remote parking enforcement system status information relating to the subject vehicle, the status information comprising at least one of: expired parking ticket information, currently active citations, and expired citations; and
   presenting said status information relating to the subject vehicle via a user interface displayed on the display of the mobile device.

22. The method of claim 1, wherein each zone has an associated schedule defining a time window within which parking rules associated with said zone are in force, and the method further comprises providing an indication to the user via the user interface of the mobile device if a current time is outside the time window.

23. A method of performing parking policy enforcement using a system having one or more processors, memory, and a network interface, the method comprising:
   receiving, via the network interface, a license plate number of a subject vehicle and a selected street-and-zone pair of a set of street-and-zone pairs, each street-and-zone pair identifying a street and a zone within which at least a portion of the street is located, the street and the zone, in combination, being associated with one or more parking rules, the selected street-and-zone pair corresponding to a location of the subject vehicle;
   determining parking rights of the subject vehicle based at least in part on the license plate number;
   determining whether the subject vehicle is in violation of one or more parking rules associated with the street and the zone, in combination, of the selected street-and-zone pair based at least in part on the parking rights of the subject vehicle; and
   transmitting a violation indication, via the network interface, the violation indication indicating whether the subject vehicle is in violation of the one or more parking rules associated with the street and the zone, in combination, of the selected street-and-zone pair.

24. A method of performing parking policy enforcement using a mobile device having one or more processors, memory, and a network interface, the method comprising:
   presenting a set of street-and-zone pairs via a user interface displayed on a display of the mobile device, each street-and-zone pair identifying a portion of a street extending over a street number range for parking of a number of vehicles and one of a plurality of zones, the portion of the street and the zone, in combination, being associated with one or more parking rules;
   receiving, via the user interface, a selection of a street-and-zone pair of the set of street-and-zone pairs, the selected street-and-zone pair corresponding to a location of a subject vehicle among other vehicles parked within said street number range of said selected street-and-zone pair;
   obtaining a license plate number of the subject vehicle;
   transmitting, via the network interface, the license plate number to a remote parking enforcement system;
   determining parking rights of the subject vehicle based at least in part on the license plate number;
   determining whether the subject vehicle is in violation of one or more parking rules associated with the street and the zone, in combination, of the selected street-and-zone pair based at least in part on the parking rights of the subject vehicle; and
   presenting a violation indication via the user interface, the violation indication indicating whether the subject vehicle is in violation of the one or more parking rules associated with the street and the zone, in combination, of the selected street-and-zone pair.

25. The method of claim 24, wherein and at least some of the plurality of zones are paired with at least one portion of different streets.

* * * * *